United States Patent
Khobragade et al.

(10) Patent No.: US 12,189,579 B1
(45) Date of Patent: Jan. 7, 2025

(54) CLOUD CAPACITY SCALING IN METADATA SPACE CONSTRAINED DEDUPLICATION SYSTEMS

(71) Applicant: Dell Products L.P., Round Rock, TX (US)

(72) Inventors: Shashank Prakash Khobragade, Nagpur (IN); Santi Gopal Mondal, Bangalore (IN); Arun Vishnu Pk, Bangalore (IN); Kalyan Gunda, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/450,250

(22) Filed: Aug. 15, 2023

(51) Int. Cl.
- *G06F 16/10* (2019.01)
- *G06F 11/14* (2006.01)
- *G06F 16/174* (2019.01)

(52) U.S. Cl.
CPC ...... *G06F 16/1748* (2019.01); *G06F 11/1464* (2013.01); *G06F 11/1469* (2013.01); *G06F 2201/80* (2013.01)

(58) Field of Classification Search
None
See application file for complete search history.

(56) References Cited

U.S. PATENT DOCUMENTS

| | | | |
|---|---|---|---|
| 11,080,332 B1 * | 8/2021 | Acheson | G06F 16/2379 |
| 2020/0344084 A1 * | 10/2020 | Shribman | G06F 16/955 |
| 2023/0236725 A1 * | 7/2023 | Madan | G06F 12/1408 |
| | | | 711/103 |

\* cited by examiner

*Primary Examiner* — Jau Shya Meng
(74) *Attorney, Agent, or Firm* — Staniford Tomita LLP

(57) ABSTRACT

Containers are generated including data containers storing segments of files, segment tree containers storing upper-level segments of segment trees representing the files, and cloud containers storing headers from the data and segment tree containers. A header for a data container includes fingerprints identifying the segments of files. A header for a segment tree container includes fingerprints identifying the upper-level segments. The containers are sent to cloud storage for storage as a cloud unit. The cloud unit is attached to a deduplicated storage appliance by storing at the appliance the segment tree and cloud containers, cloud configuration details, and an index. The cloud configuration details identify the cloud storage having the cloud unit. The index maps the fingerprints to the containers. When a cloud unit is to be detached, the segment tree and cloud containers, and index from the local storage are deleted, but the cloud configuration details are maintained.

18 Claims, 31 Drawing Sheets

---

Detach the cloud unit by deleting the segment tree and cloud containers, and index from the local storage
1710

Maintain the cloud configuration details of the now detached cloud unit on the local storage
1715

```
┌─────────────────────────────────────────────────────────────────────────────┐
│ When a cloud unit that has been detached is to be attached back to the      │
│ deduplicated storage appliance, consult the cloud configuration details to  │
│ access the cloud unit in the cloud storage                                  │
│                                   1910                                      │
└─────────────────────────────────────────────────────────────────────────────┘
                                      ↓
┌─────────────────────────────────────────────────────────────────────────────┐
│           Mark the cloud unit as being in a transient state of attachment   │
│                                   1915                                      │
└─────────────────────────────────────────────────────────────────────────────┘
                                      ↓
┌─────────────────────────────────────────────────────────────────────────────┐
│ Prioritize recovery of the cloud containers over the segment tree containers│
│                          stored in the cloud unit                           │
│                                   1920                                      │
└─────────────────────────────────────────────────────────────────────────────┘
                                      ↓
┌─────────────────────────────────────────────────────────────────────────────┐
│ While the cloud containers are being recovered, rebuild the index of the    │
│ cloud unit from cloud containers that have been recovered                   │
│                                   1925                                      │
└─────────────────────────────────────────────────────────────────────────────┘
                                      ↓
┌─────────────────────────────────────────────────────────────────────────────┐
│ Upon receipt of a request to access a segment tree container of the cloud   │
│ unit that has not yet been recovered, redirect the request to the cloud     │
│ storage                                                                     │
│                                   1930                                      │
└─────────────────────────────────────────────────────────────────────────────┘
```

FIG. 19

CLOUD CAPACITY SCALING IN METADATA SPACE CONSTRAINED DEDUPLICATION SYSTEMS

CROSS-REFERENCE TO RELATED APPLICATIONS

This application is related to co-pending U.S. patent application Ser. No. 18/450,268, filed Aug. 15, 2023, and is incorporated herein by reference for all purposes.

TECHNICAL FIELD

The present invention relates generally to information processing systems, and more particularly to deduplication storage systems utilizing cloud storage.

BACKGROUND

Storage appliances are a type of hardware device that are designed to provide storage services to an organization. They include components such as storage disks, controllers, and software and are typically deployed on-premises of an organization. Since they are deployed locally, they can offer very good performance.

Some storage appliances provide deduplication. Deduplication is a technique that seeks to reduce the amount of redundant data that is stored. Nonetheless, even with deduplication, a growing organization can quickly exceed the storage capacity of their storage appliance. Adding storage disks can be expensive. For example, in addition to the initial capital costs of purchasing such hardware, there are ongoing costs due to maintenance, updates, and so forth.

Cloud storage, however, can offer a near infinite amount of storage space at very low costs compared to traditional on-premises storage. There is a need for improved systems and techniques to facilitate cloud storage in conjunction deduplicated storage systems.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY

In at least one embodiment, containers are generated including data containers storing segments of files, segment tree containers storing upper-level segments of segment trees representing the files, and cloud containers storing headers from the data and segment tree containers. A header for a data container includes fingerprints identifying the segments of files. A header for a segment tree container includes fingerprints identifying the upper-level segments. The containers are sent to cloud storage for storage as a cloud unit. The cloud unit is attached to a deduplicated storage appliance by storing at the appliance the segment tree and cloud containers, cloud configuration details, and an index. The cloud configuration details identify the cloud storage having the cloud unit. The index maps the fingerprints to the containers. When a cloud unit is to be detached, the segment tree and cloud containers, and index from the local storage are deleted, but the cloud configuration details are maintained.

In at least one embodiment, cloud units in cloud storage include containers including data containers storing file segments, segment tree containers storing upper-level segments of segment trees representing the files, and cloud containers storing headers from the data and segment tree containers. A header for a data container includes fingerprints identifying the file segments. A header for a segment tree container includes fingerprints identifying the upper-level segments. A storage appliance stores a first level of metadata for each cloud unit in a read-write state, a second level of metadata for each cloud unit in a read-only state, and a third level of metadata for each cloud unit in an offline state. The third level requires less storage than the first and second levels. The second level requires less storage than the first level. The limited metadata space of the appliance is managed by maintaining at least a subset of cloud units in the read-only state.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 19 shows a flow for attaching a cloud unit that has been detached back to the deduplicated storage appliance, according to one or more embodiments.

DETAILED DESCRIPTION

Figure 1:
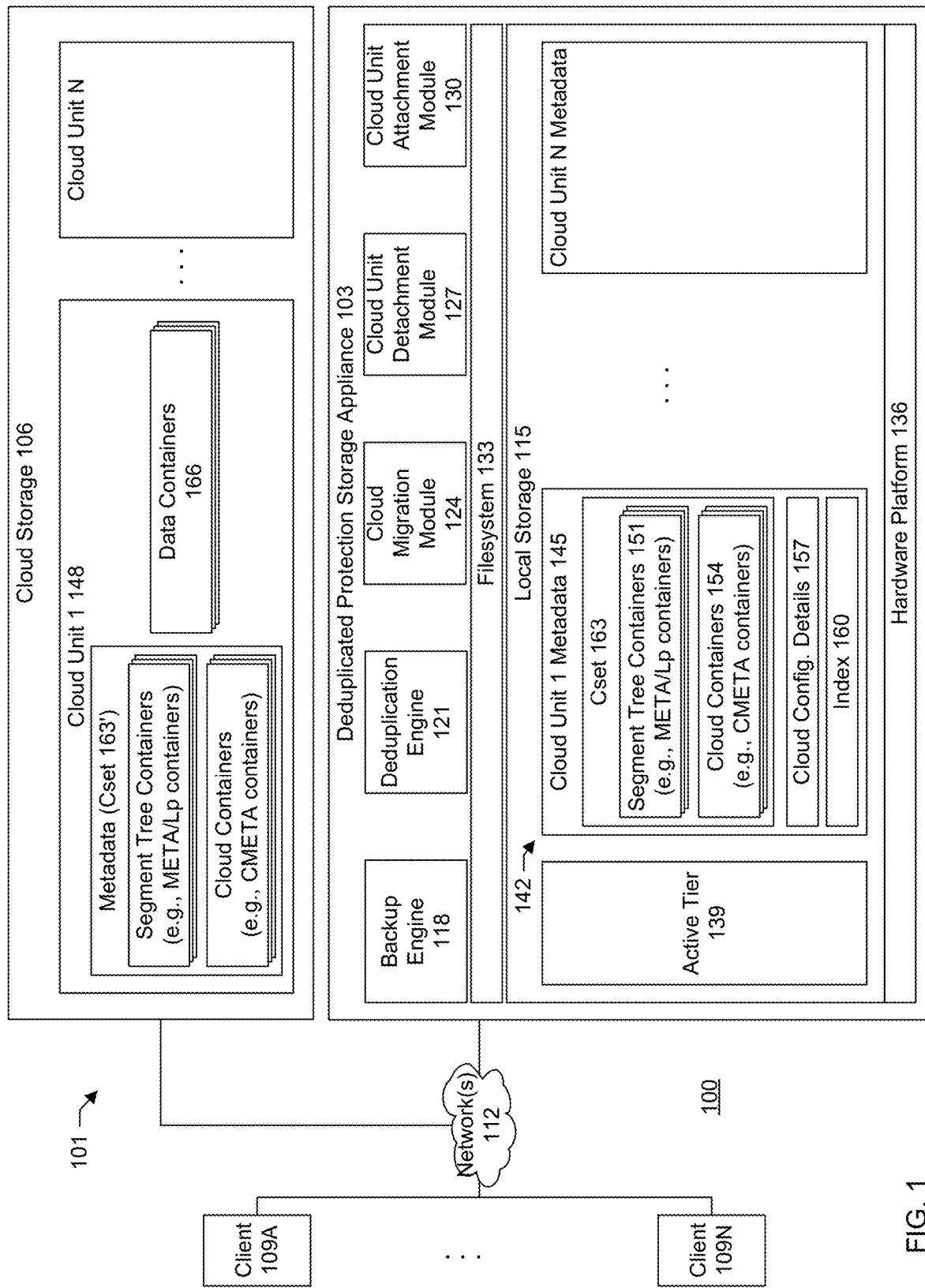
FIG. 1 shows a block diagram of an information processing system for cloud capacity scaling in metadata space constrained deduplication systems, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two. It should be appreciated that the blocks, components, and modules shown in the figures may be functional and there can be many different hardware configurations, software configurations, or both to implement the functions described.

In at least one embodiment, secondary storage data protection systems purposed as a backup data storage appliance, employs deduplication to store more data in less space by leveraging data redundancy. Cloud long-term storage duplication can store more data in less space by leveraging data redundancy. Cloud long-term storage extends the advantages of deduplication to the cloud. Multiple cloud providers can be configured on the same deduplication system creating a multi-cloud environment. Cloud storage can include a public cloud, private cloud, or both.

In at least one embodiment, a deduplication system includes a cloud tier that employs a metadata-data separated architecture. Metadata is stored locally and data is stored on the cloud. This helps to achieve efficient deduplication both in terms of transaction cost and performance. Locally available metadata enables identification of migration eligible data, non-redundant with cloud data, thus achieving faster deduplication. Cloud capacity scaling solutions are highly sought after to satisfy the growing data needs.

Data retention periods for some industries like finance and healthcare is in the range of 7 to 20 years. The long-term retention of the data is maintained for compliance reasons and is not accessed frequently. Thus, a need for cost-effective data scaling solutions arises. For scaling solutions, metadata storage space needs to be scaled as per data storage. This results in higher cost as metadata shelves are generally expensive, low latency, high speed storage like flash, to achieve high performance.

Additionally, more metadata shelves increase local rack space usage and total cost of ownership. In at least one embodiment, systems and techniques provide a cost effective, vertical, zero downtime, metadata space-constrained cloud capacity scaling solution which employs detach-attach workflows to avoid the added cost of extra metadata storage required or scaling cloud capacity.

In at least one embodiment, a "detach" process cleans up or deletes metadata corresponding to the unit being detached and an "attach" process recovers/rebuilds metadata for the unit being attached, thus, facilitating cloud capacity scaling without additional metadata storage requirement. Capacity-scaling is accomplished with minimum disruption and no filesystem downtime. Multi-cloud use cases requiring data to be kept with different cloud vendors for compliance reasons can scale seamlessly with attach-detach of the cloud tier storage units. In at least one embodiment, the provided systems and techniques satisfy these requirements with fs-online detach and attach operations. Additionally, in at least one embodiment, the attach operation is optimized with selective and lazy synchronization ("sync") of metadata while exploiting parallelism between sub-operations.

FIG. 1 shows a block diagram of an information processing system 100 within which methods and systems for scaling the cloud capacity of metadata space-constrained deduplication storage systems may be implemented. The example shown in FIG. 1 includes a data protection system 101 that includes a deduplicated storage appliance 103 and cloud storage 106. There are a set of clients 109A-N and a network 112 that connects each of the different components of the system.

In an embodiment, the storage appliance provides for a secondary or data protection backup system for the clients. The storage appliance may be located locally on-site or on-premises of an organization such as within a data center of the organization. The storage appliance manages data or files that have been backed up to the storage appliance from the clients. In at least one embodiment, the storage appliance is a deduplicated storage appliance. Deduplication is a technique that can reduce the amount of redundant data that is stored. During a deduplication operation, a determination is made as to whether a segment of data is a duplicate of another segment of data that is already stored. If so, the segment is not again stored or written to storage. Instead, a metadata reference is generated to point to the already existing data segment on storage.

The deduplicated storage appliance interfaces with any number of cloud storage providers to migrate data from the storage appliance to cloud storage provided by the cloud storage providers. Some examples of cloud providers offering cloud storage include Amazon Web Services (AWS), Microsoft Azure, or Google Cloud, among others. Cloud storage can offer economies of scale that can help reduce the costs to the organization of storing data. The storage appliance, however, retains management over the data migrated to cloud storage. That is, clients can use an interface of the storage appliance to access both data stored locally at the storage appliance and migrated data stored remotely at cloud storage.

Even when a majority of the organization's data is migrated to cloud storage, there remains a need to maintain at least some metadata locally at the storage appliance in order to provide management and facilitate performance, including deduplication, to the remotely stored cloud data. The amount of metadata space available locally at the storage appliance, however, is generally fixed, constant, or predetermined and it can be very expensive to add local storage for metadata. In at least one embodiment, systems and techniques are provided that allow a deduplicated storage appliance to scale the amount of data maintained and managed in cloud storage without having to add additional local storage devices for the associated metadata.

In at least one embodiment, the deduplicated storage appliance includes local storage 115 and various components including a backup engine 118, deduplication engine 121, cloud migration module 124, cloud unit detachment module 127, cloud unit attachment module 130, and file-system 133. An underlying hardware platform 136 of the storage appliance includes hardware components such as storage devices (e.g., hard disk drives (HDDs), solid state drives (SSDs) or flash storage), memory, central processing units (CPUs), and other hardware.

The backup engine is responsible for backing up or copying data of the clients, such as client files, to the deduplicated storage appliance. The backed up files or other data may be stored by the deduplicated storage appliance in a format that is different from a native format of the primary file copies at the clients. For example, backups may be stored in a compressed format, deduplicated format, or both.

The deduplication engine is responsible for deduplication operations. In at least one embodiment, data such as files to be backed up are divided into a set of segments. The segments are hashed to generate a set of fingerprints. These fingerprints uniquely identify the segments. The data protection appliance maintains metadata separate from the actual client data being backed up. The metadata includes a collection of fingerprints corresponding to data segments that already exist on or are managed by the data protection storage system.

If the fingerprint of a data segment from a file to be backed up does not match an existing fingerprint, the data segment is written to the physical disk storage of the storage system and the fingerprint is added to the collection of existing fingerprints. If, however, the fingerprint matches an existing fingerprint, the data segment is determined to be a duplicate and is not written to the storage system. Instead, a reference is generated that points to the already existing data segment on backup storage that corresponds to the fingerprint. The reference is stored as metadata by the data protection system so that the file can be reconstructed or reassembled as part of a restore operation.

The filesystem is responsible for managing the metadata, organizing file data segments, and presenting the data in a logical format to the clients and applications.

The cloud migration module is responsible for moving data from local storage of the deduplicated storage appliance to cloud storage. Moving data from local storage to cloud storage may be referred to as cloud tiering. In at least one embodiment, the data is grouped into a logical unit referred to as a cloud unit. A cloud unit may be referred to as a cloud collection partition (cp). Deduplication is used during cloud tiering or migration operations to reduce the amount of redundant data transmitted to cloud storage. The deduplication operation identifies segments already present at cloud storage so that they do not have to again be sent.

A client user, such as a backup administrator, can use a policy builder of the storage appliance to configure data movement policies. A data movement policy specifies conditions under which data, e.g., files, is moved to different storage tiers of the data protection system. In at least one embodiment, a data movement operation to cloud storage is automatically triggered by a data movement policy. The data movement policy specifies one or more criteria or conditions for when data in local storage should be moved to cloud storage. The conditions may include business unit of the organization that owns the file, file age or time that the file has remained in the active tier of the storage system, date the file was last recalled from the storage system to a client, other conditions, or combinations of these. The migration module evaluates the policy to determine whether conditions for moving a particular file to cloud storage have been satisfied. If so, the particular file is automatically moved from local storage of the storage appliance to cloud storage. Alternatively, the data movement operation may be triggered on-demand, such as via a request from the user.

In at least one embodiment, the cloud unit represents a logical storage container of the cloud storage provider (e.g., AWS bucket). The cloud unit may include a connector to an object storage provided by the cloud storage provider. In an least one embodiment, the migration module interfaces with various application programming interfaces (APIs) that may be exposed by different cloud storage providers to create a cloud unit at a particular cloud storage provider and move data or files from local storage of the deduplicated storage appliance into the cloud unit.

For example, in the case of AWS, the cloud migration module may connect to the AWS interface, e.g., S3 REST API, and generate and send commands through the API to create an Amazon S3 bucket in an AWS account associated with the customer user. Creating the cloud unit may include, for example, receiving the customer user's AWS account credentials (e.g., username and password) and transmitting the AWS account credentials to AWS in order to create the S3 bucket in the customer user's AWS account. The cloud migration module registers the S3 bucket as a cloud unit with the filesystem and assigns the cloud unit a unique identifier. The identifier assigned to the cloud unit may be based on an object or container identifier generated by the cloud provider and another identifier generated by the cloud unit migration module.

Local storage of the deduplicated storage appliance includes a region having an active tier 139 and another region storing cloud metadata 142. Initial backups from the clients are stored in the active tier. As these backups or secondary copies age, the backups may be moved from the active tier to a different tier such as a cloud tier or cloud storage tier. As discussed, however, in at least one embodiment, a region on local storage of the storage appliance stores metadata referencing the client or user-generated file data that has been moved to cloud storage. The locally stored metadata may be referred to as cloud metadata. At least a portion of the locally stored cloud metadata may additionally be mirrored to cloud storage for disaster recovery or other purposes.

Storing the cloud metadata locally at the storage appliance facilitates, among other things, deduplication performance and evaluation of data for cloud migration. For example, in at least one embodiment, fingerprints of data segments moved to cloud storage are stored locally at the storage appliance. When, for example, a determination is required as to whether a data segment should be written to cloud storage, a fingerprint of the data segment can be compared against a set of locally stored fingerprints corresponding to data segments already written to or already present at cloud storage. Reading a set of locally stored fingerprints offers much better performance over reading the fingerprints remotely from cloud storage.

As discussed, in at least one embodiment, a cloud unit includes a logical grouping of data moved to cloud storage and managed by the filesystem of the deduplicated storage appliance. Cloud units immediately available for input/output (IO) or read/write operations by the filesystem may be considered attached to the filesystem or storage appliance. Cloud units not immediately available for IO or read/write operations by the filesystem may be considered detached from the filesystem or storage appliance. For example, an attempt to issue a write operation to a detached cloud unit will result in an error.

The cloud unit detachment module is responsible for detaching a cloud unit from the filesystem or storage appliance. Detaching a cloud unit renders the cloud unit unavailable for immediate read/write operations by the filesystem, but frees up metadata space on local storage for creating or attaching other cloud units. The detachment operation of a particular cloud unit removes or deletes a portion of locally stored cloud metadata on the storage appliance associated with the particular cloud unit. When the need arises, however, a detached cloud unit can be attached back to the filesystem or storage appliance. The attachment operation recalls, recovers, and rebuilds the cloud metadata on the storage appliance thereby making the cloud unit available again for immediate read/write operations by the filesystem.

The example shown in FIG. 1 includes metadata 145 stored locally at the deduplicated storage appliance and associated with a cloud unit 148 in cloud storage. Metadata is created and maintained for each cloud unit. The metadata for a particular cloud unit includes several data structures and types including segment tree containers 151, cloud containers 154, cloud configuration details 157, and an index 160. The segment tree containers may be referred to as META containers or Lp containers. The cloud containers may be referred to as CMETA containers. In an embodiment, the segment tree containers and cloud containers are grouped into a logical unit that may be referred to as a CSet 163.

In at least one embodiment, a copy 163' of the CSet is mirrored to cloud storage. The cloud storage further includes a set of data containers 166 storing actual data segments of files that have been moved from the active tier of the storage appliance to cloud storage. A container may include a header section and a data or body section. The data or body section stores segments; and the header section stores identifiers of the segments stored in the data or body section.

In at least one embodiment, the files are represented as segment trees. The segment tree containers store upper-level segments of the segment trees representing the files. The cloud containers store headers from the data containers and the segment tree containers. A header for a particular data container includes fingerprints identifying the segments of files stored in the particular data container. A header for a particular segment tree container includes fingerprints identifying the upper-level segments stored in the particular segment tree container.

Thus, in at least one embodiment, there can be three types of containers. A first type of container may be referred to as a data container. The data container contains actual file data segments which may be referred to as L0 segments. A second type of container may be referred to as a META container, Lp container, or segment tree container. The META container contains upper-level segments of segment trees representing the files. A third type of container may be referred to as a CMETA or cloud container. The CMETA container contains metadata from the data containers and META containers. In other words, the CMETA container stores the metadata of other data containers and other META containers.

The index includes a mapping between the fingerprints and containers within which the segments are stored. That is, the index maps a fingerprint of a segment to a container in which the segment is stored. The index may include a listing of fingerprints of segments and a corresponding listing of container IDs of containers in which a respective segment is stored. The segment may be a data segment (e.g., L0 segment) or metadata segment (e.g., Lp segment).

The cloud configuration details include information for accessing the cloud unit in cloud storage. The configuration information may include, for example, an identifier of the cloud unit, state information, credentials for accessing a cloud account storing the cloud unit, identification of a particular cloud storage provider at which the cloud unit is stored, and other details associated with the cloud unit.

Figure 2:
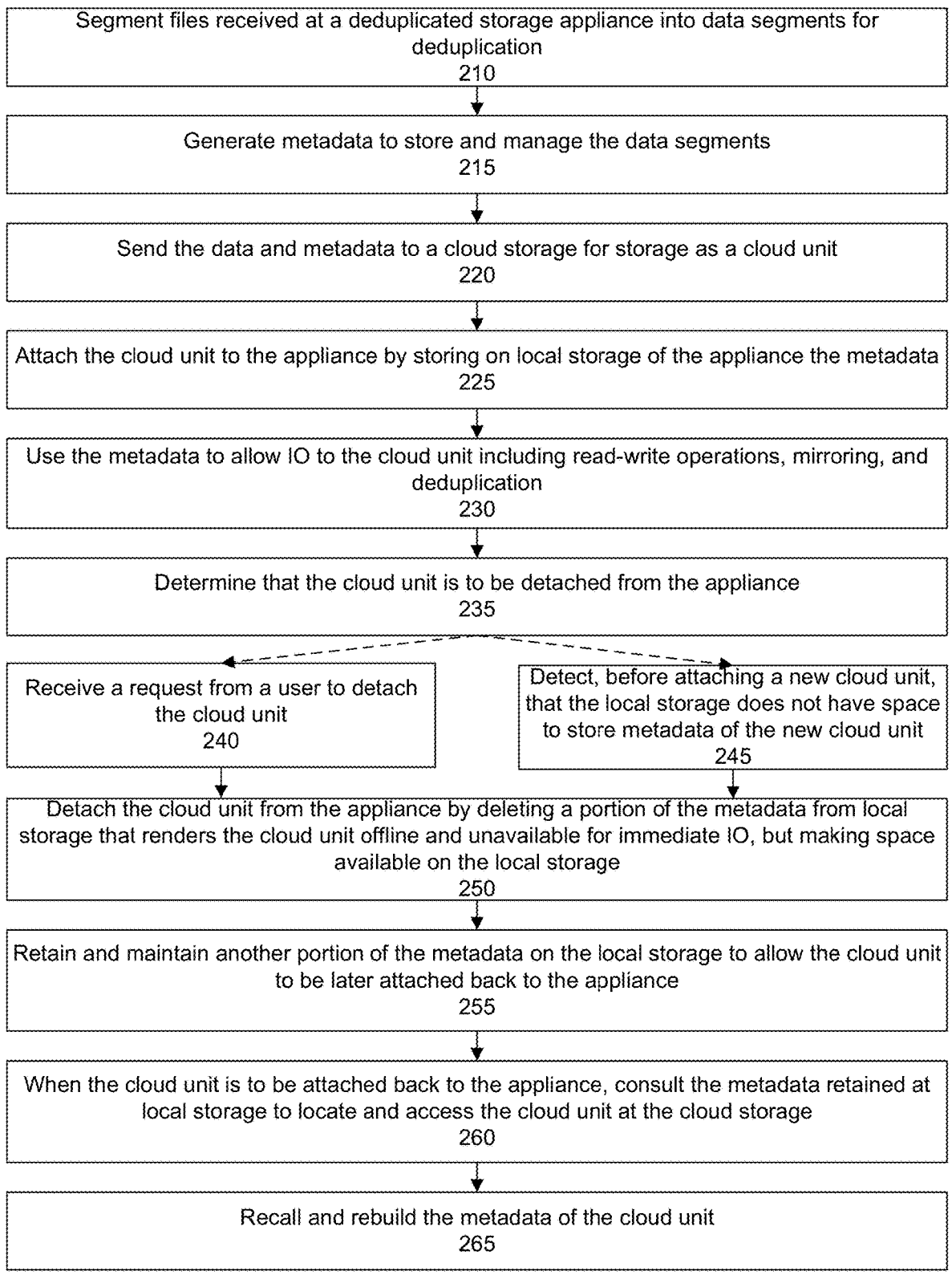
FIG. 2 shows an overall flow for cloud capacity scaling, according to one or more embodiments.

FIG. 2 shows an overall flow for cloud capacity scaling in metadata space-constrained deduplication storage systems. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In brief, in a step 210 client or user-generated files received at a deduplicated storage appliance are split into data segments for deduplication. In a step 215, metadata is generated to store and manage the data segments. In a step 220, data (e.g., client or user-generated data) and metadata is sent from the storage appliance to cloud storage for storage as a cloud unit. In a step 225, the cloud unit is attached to the storage appliance by storing on local storage of the appliance the metadata.

In a step 230, the metadata associated with the cloud unit and stored on local storage is used to facilitate IO or read/write, mirroring, and deduplication operations involving the cloud unit. In an embodiment, a cloud tiering operation includes sending file data segments (e.g., L0) segments to cloud storage and writing corresponding metadata (e.g., Lp segments) locally at the deduplicated storage appliance so that later cloud tiering operations can be deduplicated using the locally stored metadata. The cloud tiering operation further includes mirroring the metadata to cloud storage to allow for disaster recovery. That is, a copy of the metadata may additionally be kept at cloud storage to facilitate recoveries in cases where the storage appliance itself suffers a disaster.

In a step 235, a determination is made that the cloud unit is to be detached from the appliance. The determination may be based on a request from a user to detach the cloud unit (step 240). Alternatively, the determination may be based on detecting, before attaching a new cloud unit, that the local storage of the storage appliance does not have space to store metadata of the new cloud unit (step 245).

In a step 250, the cloud unit is detached from the storage appliance by deleting a portion of the metadata from the local storage that renders or places the cloud unit in an offline state and unavailable for immediate IO or read/write operations, but making space available for metadata of a new cloud unit.

In a step 255, however, a small portion of the metadata is maintained, kept, or retained on the local storage to allow the cloud unit to be later attached back to the storage appliance. In a step 260, when the cloud unit is to be attached back to the storage appliance, the metadata retained at the local storage is consulted to locate and access the cloud unit at the cloud storage. In a step 265, the metadata of the cloud unit is recalled, recovered, and rebuilt on local storage of the storage appliance. The recall or recovery may be referred to as a synchronization or sync operation as metadata stored with the cloud unit at cloud storage is copied back to local storage of the storage appliance.

Figure 3:
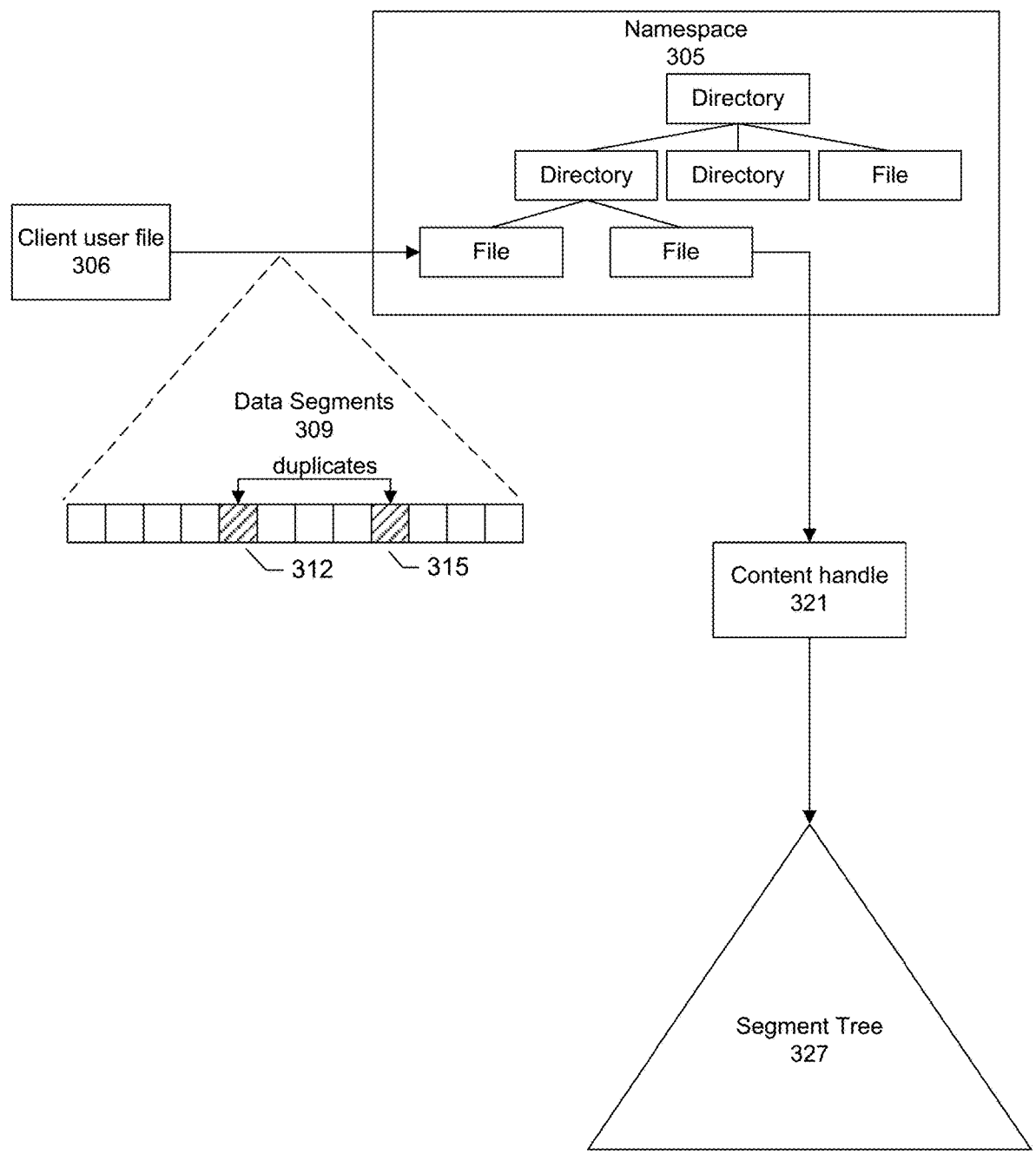
FIG. 3 shows an example of a deduplication process of the deduplicated storage appliance, according to one or more embodiments.

FIG. 3 shows a block diagram illustrating a deduplication process of the filesystem of the deduplicated storage appliance according to one or more embodiments. As shown in the example of FIG. 3, the filesystem includes a namespace 305. The namespace provides an organizational structure for identifying and organizing the files stored in the filesystem. In an embodiment, there is a hierarchical organization in which files are organized into directories, subdirectories, and so forth.

As data, such as a user file 306, enters the filesystem, an ingest process segments the file into data segments 309 and filters against existing segments to remove duplicates (e.g., duplicate segments 312, 315). A data segment that happens to be the same as another data segment that is already stored in the filesystem may not be again stored. This helps to eliminate redundant data and conserve storage space. Metadata, however, is generated and stored that allows the filesystem to reconstruct or reassemble the file using the already or previously stored data segment.

Any unique data segments are then packed and stored in fixed size immutable containers. A content handle 321 of the file is kept in the filesystem's namespace to support the directory hierarchy. The content handle points to a top of a segment tree 327 of the file.

Figure 4:
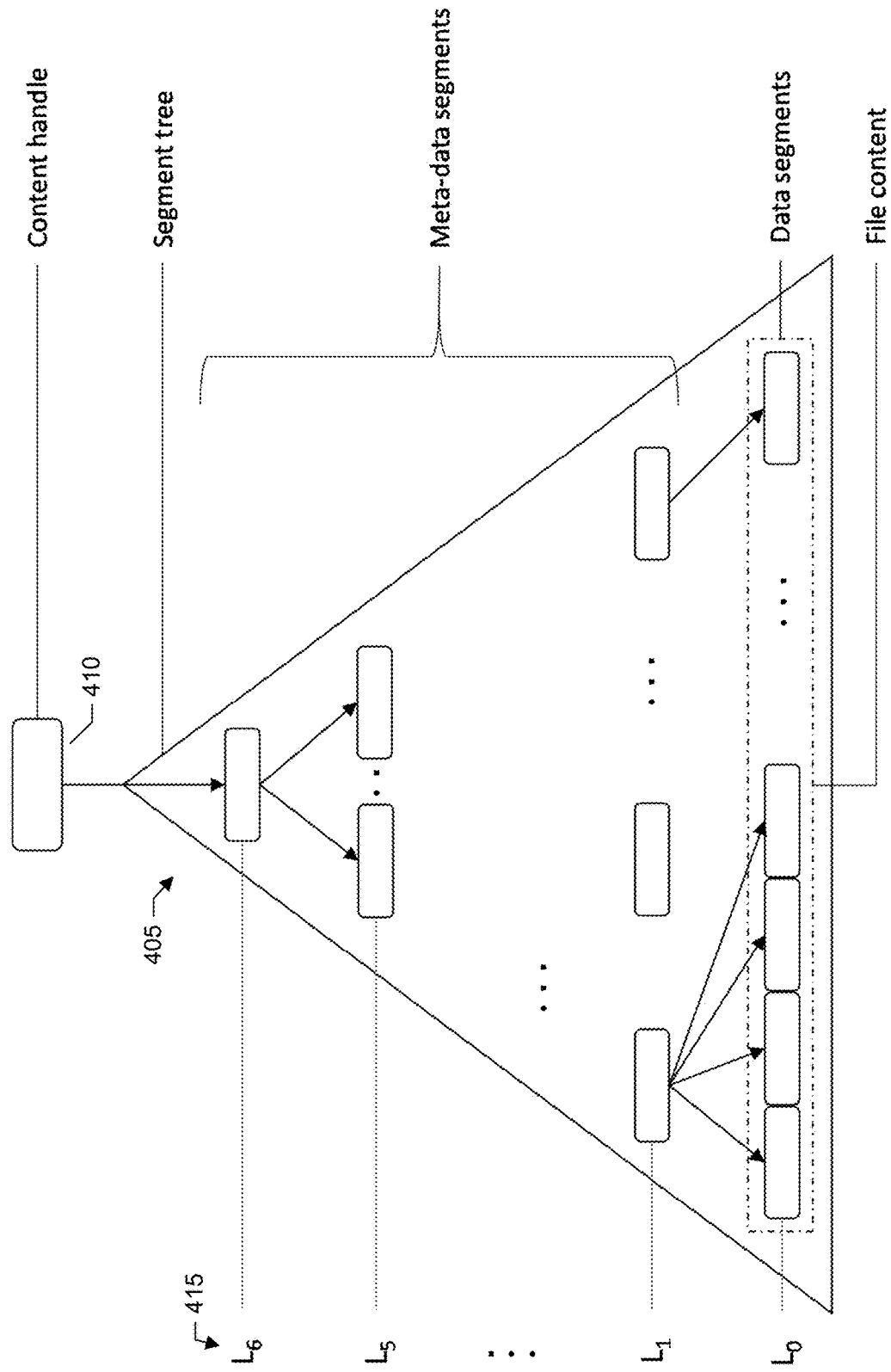
FIG. 4 shows an example of a segment tree, according to one or more embodiments.

FIG. 4 shows an example of a segment tree 405 in further detail. A content handle 410 points to a top of the segment tree. The segment tree includes a set of hierarchically arranged levels 415.

As discussed, in an embodiment, a deduplication system performs data stream chunking to create data segments which are fingerprinted to identify and eliminate redundancy, thus optimizing space usage. Segments are fingerprinted with hashing algorithms like Secure Hash Algorithm 1 (SHA1). The fingerprints are grouped together to create a metadata segment which are again fingerprinted and grouped to create a hierarchy of reference indirections which can be visualized as an n-array Merkle tree as shown in FIG. 4.

A segment tree may have any number of levels. In at least one embodiment, files in the filesystem are represented by segments trees having multiple segment levels arranged in a hierarchy. As shown in the example of FIG. 4, in at least one embodiment, there are seven levels L6 to L0. L6 refers to the top level. L6 may be referred to as a root level. L0 refers to the lowest level. Thus, the upper-segment levels (from L6 to L1) are the metadata segments and may be referred to as Lps or metadata segments. That is, the L6 to L1 segments include metadata of their respective child segments. The lowest level segments are the data segments and may be referred to as L0s, leaf nodes, or data segments. The data segments correspond to file content.

In other words, in a specific embodiment, each file in the filesystem may be represented by a segment tree. The segment tree includes a set of segment levels arranged into a hierarchy (e.g., parent-child). Each upper-level of the segment tree includes one or more pointers or references to a lower-level of the segment tree. A last upper-level of the segment tree points to the actual data segments. Thus, upper-level segments store metadata while the lowest-level segments are the actual data segments. In an embodiment, a segment in an upper-level includes a fingerprint (e.g., metadata) of fingerprints of one or more segments in a next lower-level (e.g., child-level) that the upper-level segment references.

In at least one embodiment, a segment tree stores metadata for a file where the lowest-level or L0 segments are the data segments. When a file is received by the filesystem, the file is broken, split, or divided into small segments. The segments may be placed into containers and written (e.g., written to disk or other persistent storage). An index maintains a mapping between fingerprints of the segments and the containers in which the segments are stored. The index helps to facilitate deduplication among other things. In particular, if a segment of a file has been written, a fingerprint of the segment is maintained in the index. Thus, a fingerprint of a new segment can be compared to the index. If there is a matching fingerprint, the new segment may not be written, the new segment having been determined to be a duplicate.

Figure 5:
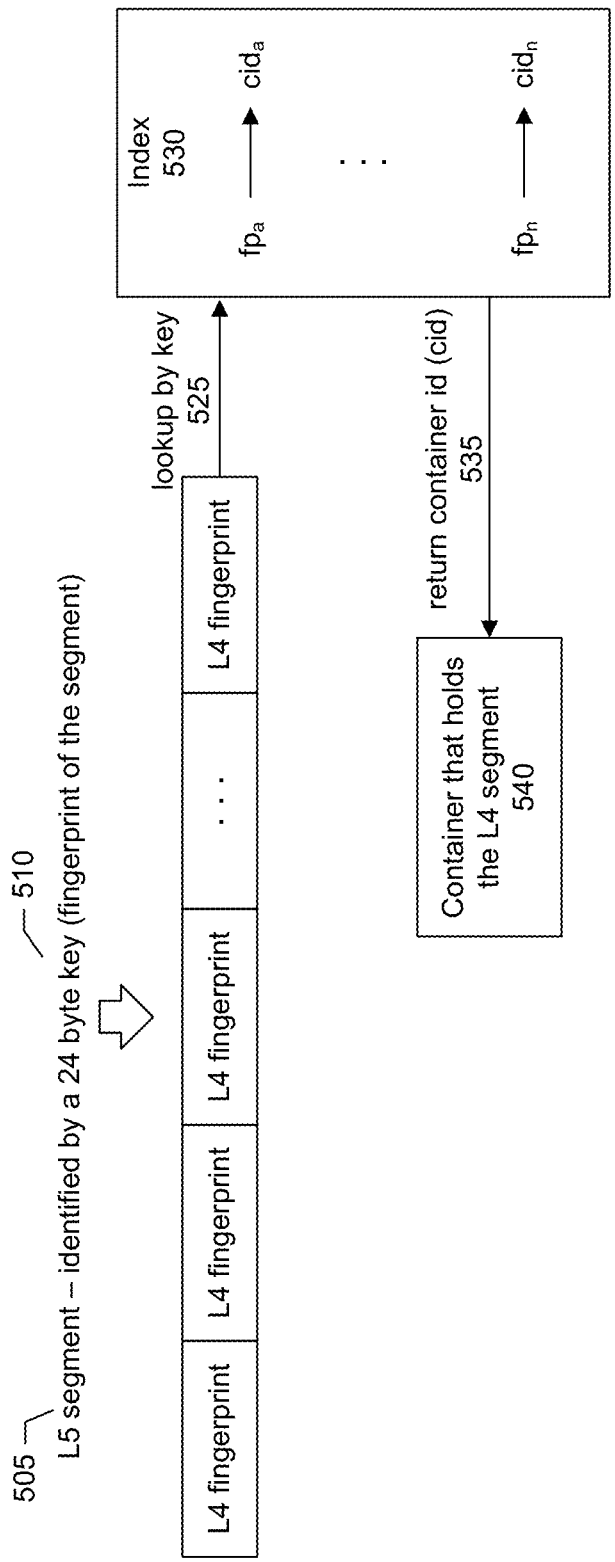
FIG. 5 shows a block diagram of an index, according to one or more embodiments.

More particularly, in at least one embodiment, every segment in the filesystem is identified by a 24 byte key (or the fingerprint of the segment), including the Lp segments. Each Lp segment contains references to lower level Lp segments. For example, FIG. 5 shows an L5 segment 505 identified by a fingerprint 510. The L5 segment contains L4 (or below) references, which is the key of that L4 segment. To locate an L4 segment, the L4 key is looked up 525 in an index 530 of the filesystem to obtain and return 535 a container identifier ("cid") of a container 540 that holds the content of the L4 segment. Thus, the index maps a fingerprint of a segment to a container in which the segment is stored. The index may include a listing of fingerprints of segments and a corresponding listing of container IDs of containers in which a respective segment is stored. The index may be referred to as a fingerprint index. An entry in the index may be formatted as "fp,cid" where "fp" refers to the fingerprint and "cid" refers to the container ID.

Figure 6:
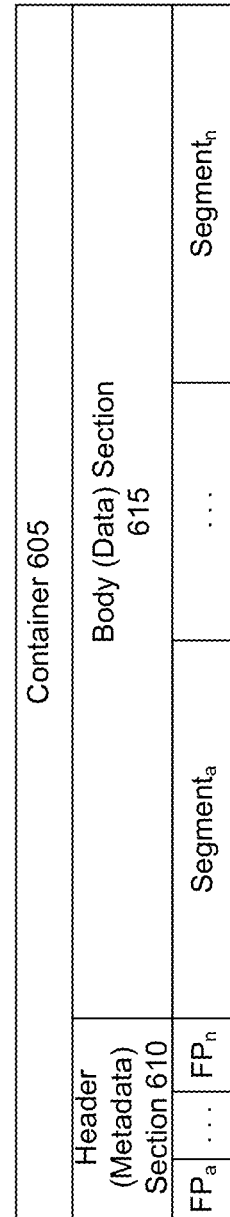
FIG. 6 shows a block diagram of a container, according to one or more embodiments.

FIG. 6 shows an example of a container 605. The container may be a data container, segment tree container, or cloud container. In at least one embodiment, the container includes a header or metadata section 610 and a body or data section 615. The body or data section stores segments. The segments may be stored in a compressed format. The header or metadata section stores fingerprints or identifiers corresponding to the segments. In other words, each container includes its own metadata that may be referred to as container metadata.

Figure 7:
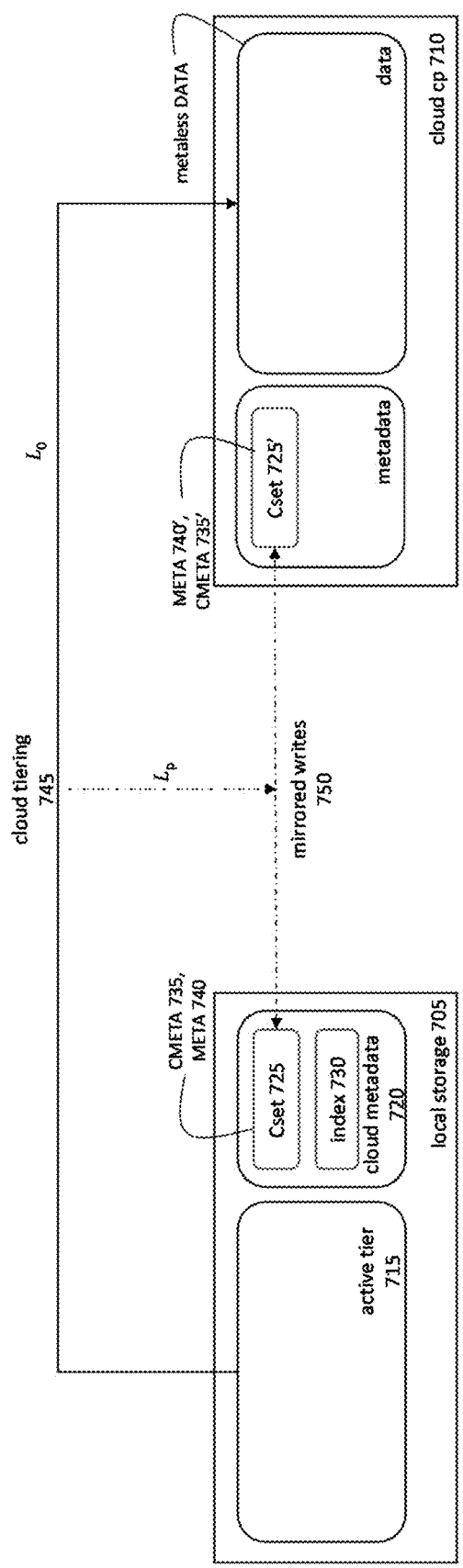
FIG. 7 shows an example of a metadata-data separated architecture for cloud tiering, according to one or more embodiments.
Figure 8:
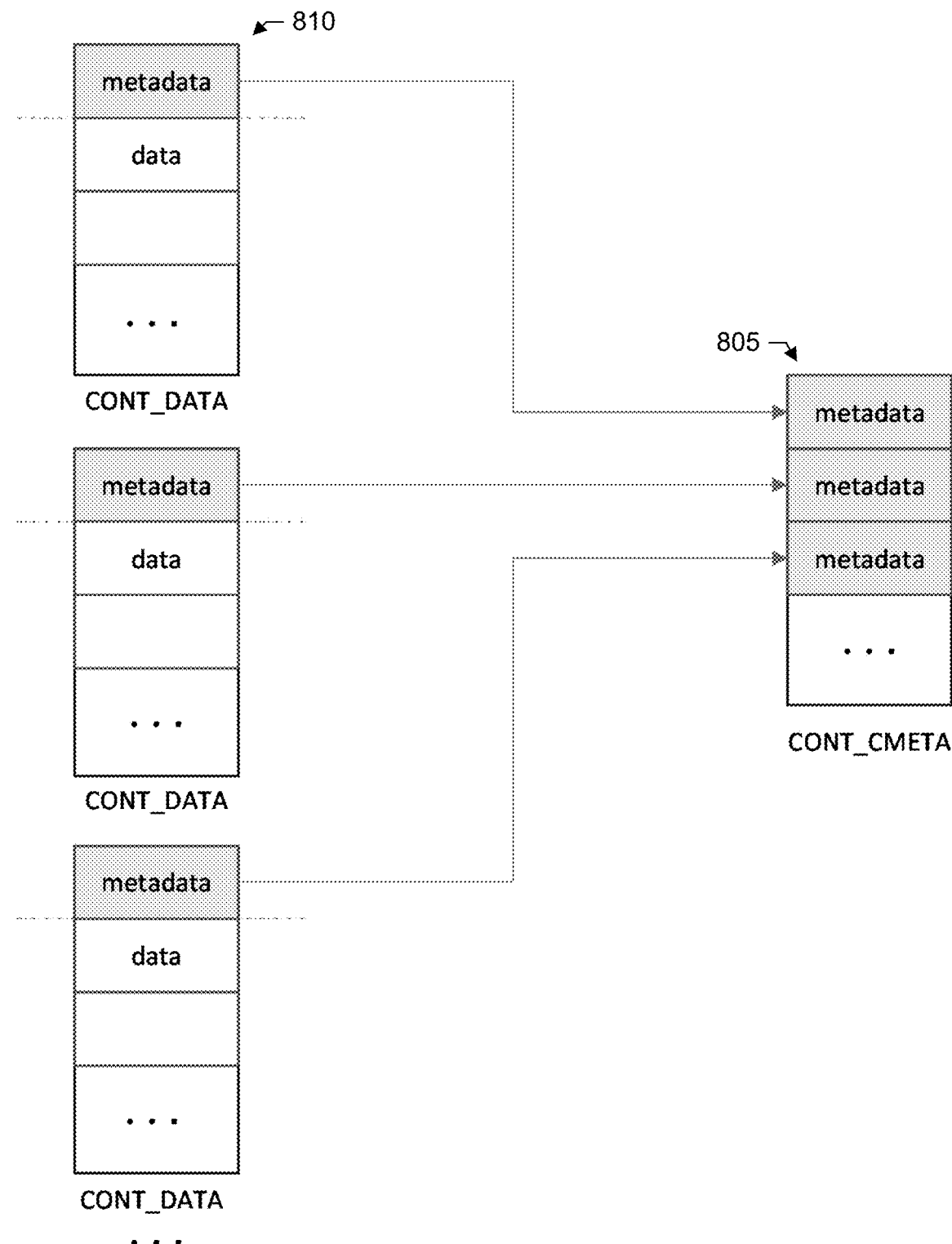
FIG. 8 shows a block diagram of a CMETA or cloud container, according to one or more embodiments.

FIG. 7 shows a block diagram illustrating a metadata-data separated architecture of the cloud tier. FIG. 8 shows an example of information stored in a CMETA or cloud container 805. Referring now to FIG. 7, in at least one embodiment, the architecture includes a local storage 705 of a deduplicated storage appliance and cloud storage 710 provided by a cloud provider. The local storage includes an active tier 715 and a region storing cloud metadata 720. The cloud metadata includes a CSet 725 and an index 730. As discussed, in an embodiment, the CSet includes CMETA containers (or cloud containers) 735 and META containers (or segment tree or Lp containers) 740.

As shown in the example of FIG. 7, a cloud tiering operation 745 moves file data segments (e.g., L0 segments or metaless data) from the active tier of the local storage to cloud storage. At least a portion of the metadata is mirrored 750 from the storage appliance to cloud storage. In an least one embodiment, writes to the CSet are mirrored as shown by a copy of CSet 725' at cloud storage, but the index is not mirrored. That is, in at least one embodiment, the index resides solely at local storage of the storage appliance and is not mirrored to cloud storage. In another embodiment, the index may be mirrored to cloud storage.

More particularly, in at least one embodiment, for a metadata-data separated architecture of a cloud tier, metadata segments (L1 to L6) are stored locally, while data segments (L0) are stored on the cloud. In at least one embodiment, metadata Lp segments are stored in containers that may be referred to as META containers or segment tree containers, while L0 data segments are stored in containers that may be referred to as DATA containers.

Referring now to FIG. 8, in at least one embodiment, the metadata section of DATA and META containers 810 of cloud files are stored in separate container-metadata containers called CMETA containers or cloud containers which are stored locally. This enables local index updates for cloud data segments and Merkle tree traversal of cloud files without issuing any cloud reads as both CMETA containers with container-metadata and META containers with Lp metadata are locally available. In at least one embodiment, collection partitions are defined which correspond to unique deduplication domains. The set of containers per collection partition (which are unique deduplication domains) are stored as a container-set or "CSet." The writes to a local CSet are mirrored to the cloud for disaster recovery purposes and are leveraged by an attach workflow of cloud tier capacity scaling.

Figure 9:
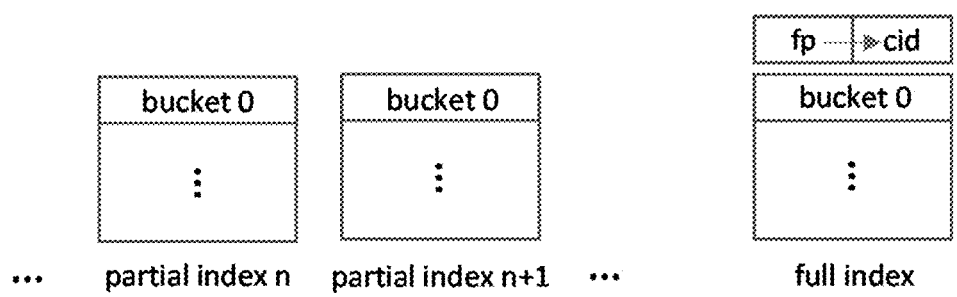
FIG. 9 shows a block diagram of partial indices and a full index, according to one or more embodiments.

In at least one embodiment, partial indices are maintained as shown in the example of FIG. 9. The fingerprint to container id mappings are persisted on a collection partition specific hash map "Index" and is maintained locally. Index lookups help traverse Merkle tree and perform deduplication, by performing fingerprint lookup. A primary index file called "full index" is used to perform lookups, while multiple secondary indices called "partial index files" are used, to maintain the history of index entries. The partial indices are also useful to rebuild the entire full index in case of loss or corruption of the full index.

Figure 10:
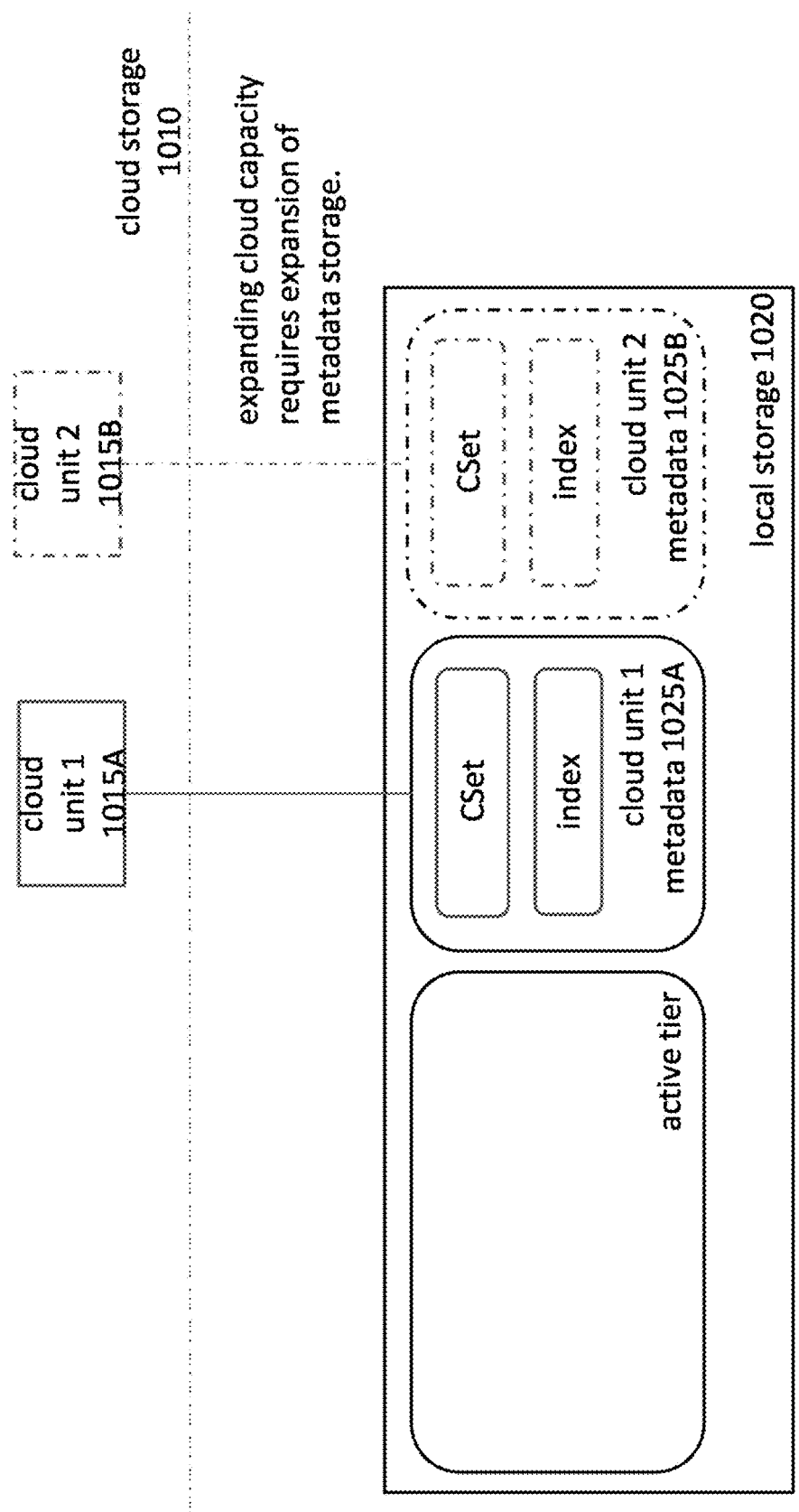
FIG. 10 shows an example of metadata space consumed during cloud capacity scaling, according to one or more embodiments.

FIG. 10 shows an example of cloud capacity scaling and metadata space consumption. Cloud storage 1010 includes a first cloud unit 1015A. Local storage 1020 of a deduplicated storage appliance stores metadata 1025A associated with the first cloud unit. As shown by the broken lines, adding or attaching a second cloud unit 1015B and expanding cloud capacity requires expansion of local metadata storage in order to store metadata 1025B for the second cloud unit.

Data storage needs are increasing with increased per capita data footprint. One of the reasons for high-capacity requirement is data retention compliance. For example, finance industries have average retention period of 7-10 years, while for health industry it is 20 years or more. Data with long retention periods is not accessed or modified frequently, as it is retained for compliance reasons. Cost effective high-capacity solutions are highly sought after to cater to compliance use cases. Deduplication-based cloud long-term retention solutions with high-space usage reduction ratio are ideal for such use cases. For deduplication systems, with metadata-data separated architecture, metadata is stored locally on a faster tier of storage such as SSDs or HDDs and data is stored on a low-cost tier such as cloud, thus achieving efficient deduplication both in terms of transaction cost and performance. With the exponential growth of data required to be kept on low-cost storage tiers, seamless scaling of capacity on the low-cost tier is desirable.

Horizontally scaling the capacity on a storage tier has its own challenges with the requirement of more and more compute nodes to efficiently perform deduplication. On the other hand, vertical cloud capacity scaling aptly satisfies the long-term retention needs of compliance with minimal cost of compute and added advantage of extensibility to already deployed systems, but local metadata space expansion as per data capacity incurs heavy cost, as metadata storage is generally on a faster tier within the datacenter. Thus, a need for cost effective metadata space constrained vertical cloud capacity scaling solution for deduplication systems arises. In at least one embodiment, systems and techniques provide for detach-attach workflows which abide by predefined metadata space constraints but enables cloud capacity scaling with little or minimum disruption and little or no filesystem downtime. The attach workflow provides low recovery time objectives for a seamless user experience.

For example, a cloud unit with 1 PiB logical data requires around 5 percent, e.g., 50TiB of metadata to be synced back where around 30 percent of it is CMETA. In at least one embodiment, systems and techniques address this problem by selectively syncing CMETA and exploiting parallelism between CMETA sync and index rebuild. Additionally, lazy sync of Lp in which Lp reads are served from cloud may be used.

Figure 11:
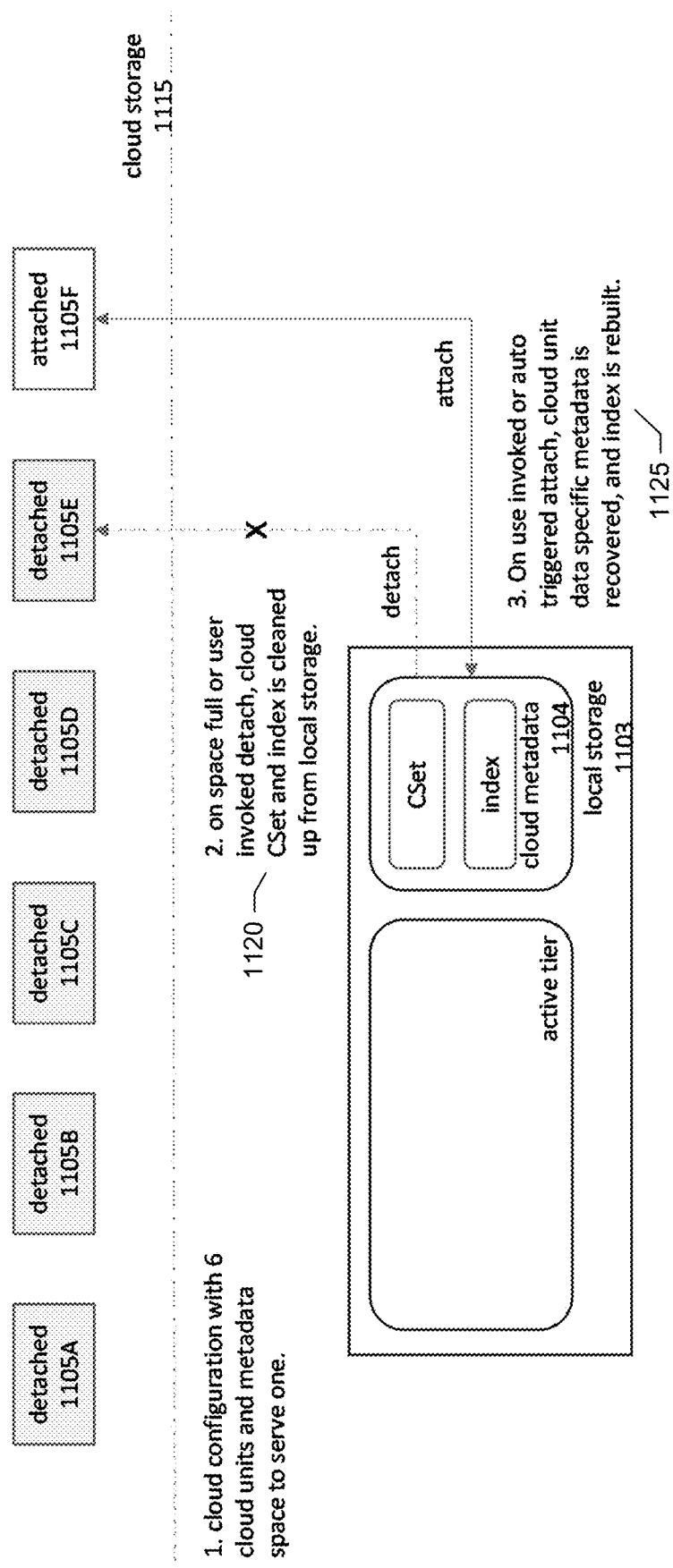
FIG. 11 shows an example of cloud capacity scaling with metadata space constraint, according to one or more embodiments.

FIG. 11 shows a technique of cloud capacity scaling with a metadata space-constraint. A deduplicated storage appliance includes local storage 1103. The storage appliance has local metadata space or capacity 1104 for a single cloud unit in cloud storage 1115, but detach-attach workflows allow for scaling the number of cloud units managed by the storage appliance.

In at least one embodiment, systems and techniques for metadata space-constrained vertical cloud capacity scaling solution employs detach-attach workflows to avoid the added cost of extra metadata storage required for scaling cloud capacity. In at least one embodiment, this results in a set of cloud units which are maintained with only a sub-set of units in read-write mode and rest in either read-only mode or not immediately accessible at all. The limited number of read-write cloud units translates to lower requirements for metadata storage space.

As shown in the example of FIG. 11, there is a cloud configuration with six cloud units 1105A-F in cloud storage yet metadata space on local storage the deduplicated storage appliance can serve just one cloud unit. This cloud configuration can be supported because cloud units 1105A-E are detached or are in an offline state while only cloud unit 1105F is attached or in an online state.

Specifically, when local metadata space has become full (or user has invoked a detach operation), cloud metadata, including CSset and index, associated with a cloud unit (e.g., cloud unit 1105E) is cleaned up 1120 from local storage. That is, cloud metadata associated with cloud unit 1105E is deleted from local storage as shown by an "X" superimposed on the detach operation. The detach operation frees, makes, or opens up space on the local storage for the attachment of a different cloud unit (e.g., cloud unit 1105F). Specifically, on a user invoked or automatic triggered attachment operation, cloud unit data specific metadata is recovered and the index is rebuilt 1125.

In at least one embodiment, the "detach" operation cleans up metadata such as CSet with CMETA and META containers and index corresponding to the detaching cloud unit. Additionally, cloud unit configuration such as cloud identity, stats, state, and so forth are cleaned up from the in-memory data structure, but are maintained on disk for reporting. The capacity scaling can be accomplished with minimum disruption and no filesystem downtime. That is, the operation is performed while the filesystem is online.

Figure 12:
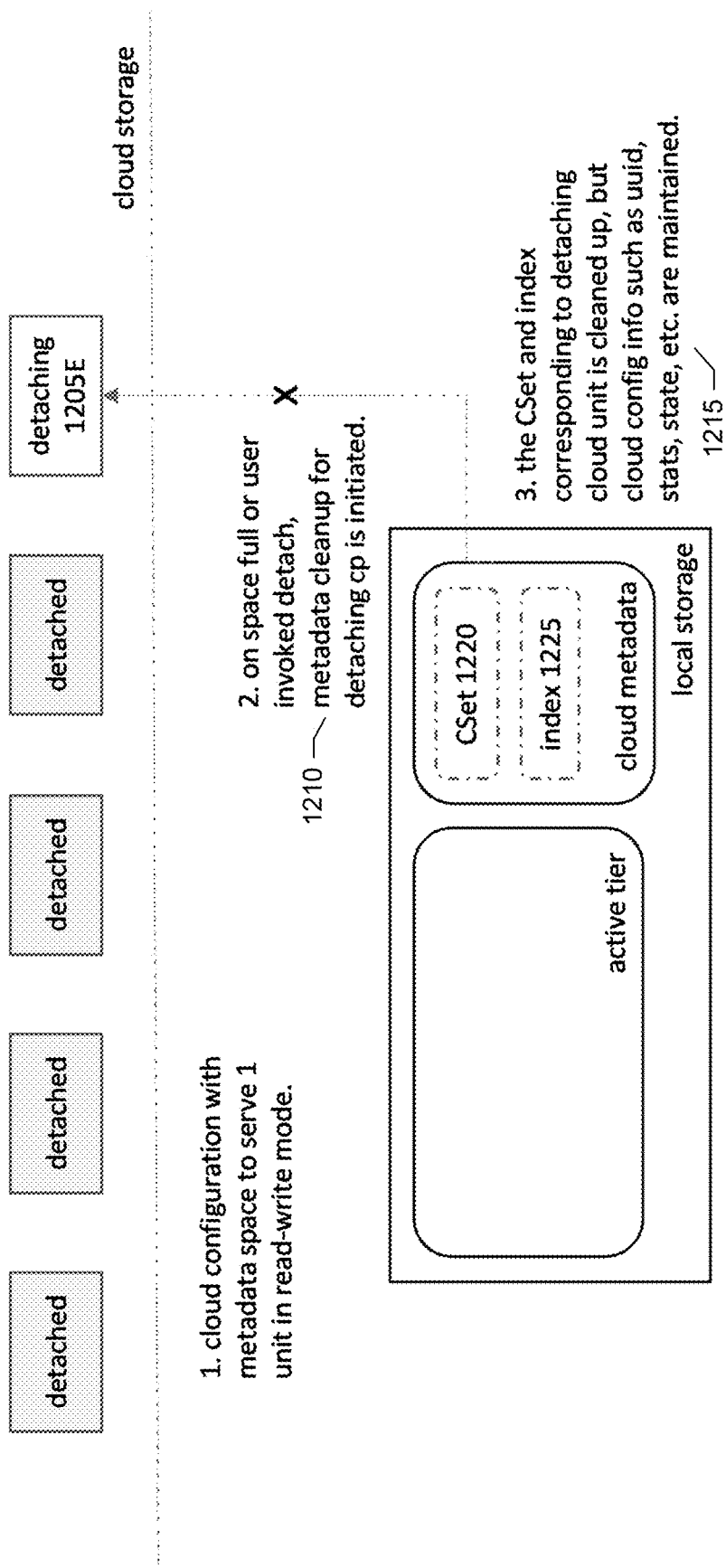
FIG. 12 shows an example of a detach operation, according to one or more embodiments.

FIG. 12 shows an example of the detach operation in further detail. In this example, a deduplicated storage appliance has metadata space to serve just one cloud unit in a read-write mode. In a step 1210, when metadata space is full (or user has invoked the detach operation), metadata cleanup for detaching a collection partition associated with a cloud unit (e.g., cloud unit 1205E) is initiated. The cloud unit enters or transitions from an "attached" state into a "detaching" state to indicate that the metadata cleanup is in progress. As indicated by the broken lines, in a step 1215, cloud metadata associated with cloud unit 1205E including CSet 1220 and index 1225 are deleted from local storage of the deduplicated storage appliance. The CSet and index corresponding to the detaching cloud unit is cleaned up, but the cloud configuration information such as UUID, stats, state, and so forth are maintained on the local storage.

On a user invoked or system-triggered attach operation, the cloud unit metadata such as collection partition uuid, name, state, and so forth are re-hydrated in in-memory data structures. The entirety of the attach operation is performed while the filesystem is online and without any impact or downtime of other read-write or read-only cloud units. During the attach operation, the cloud unit being attached is marked to be in a transient "attaching" state to handle any access request. In at least one embodiment, the attach workflow includes three optimizations including CMETA only sync, parallel index rebuild, and lazy Lp sync with temporary reads from cloud.

Figure 13:
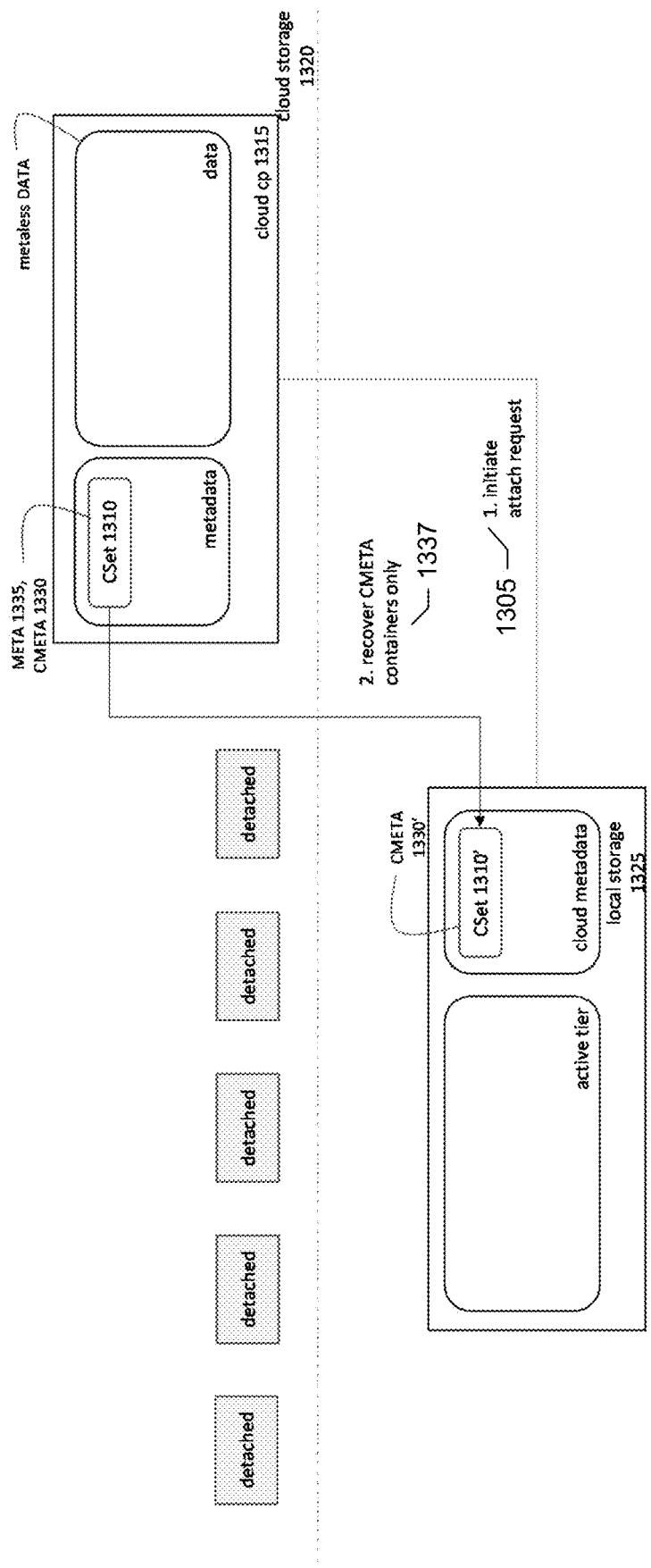
FIG. 13 shows an example of limiting recovery to CMETA or cloud containers, according to one or more embodiments.

FIG. 13 shows an example of a CMETA only recovery during an attachment operation. On invocation 1305, a cloud CSet 1310 associated with a particular cloud unit or cloud collection partition 1315 at cloud storage 1320 is opened to be iterated for re-sync. Cloud CSet header is checked for sanity. A local CSet 1310' is created at local storage 1325 for the cloud cp to be attached. The cloud CSet which has CONT_CMETA 1330 and CONT_META 1335 containers are traversed 1337 to sync only CMETA containers 1330', while any Lp containers (i.e., META or segment tree containers) are skipped to be synced later. Async threads populate local CSet as per CMETA containers read from cloud CSet. Ever increasing container ids are used to identify the range the containers processed. This range is then used to rebuild the index in parallel. In at least one embodiment, a method includes selecting a subset of cloud or CMETA containers stored with a cloud unit in cloud storage to process; recalling the subset of cloud containers from cloud storage to local storage; rebuilding a portion of an index using the subset of cloud containers that have been recalled; while the portion of the index is being rebuilt, selecting and recalling a next subset of the cloud containers to process; and repeating the selecting, recalling, and rebuilding until all cloud containers have been proceeded.

Figure 14:
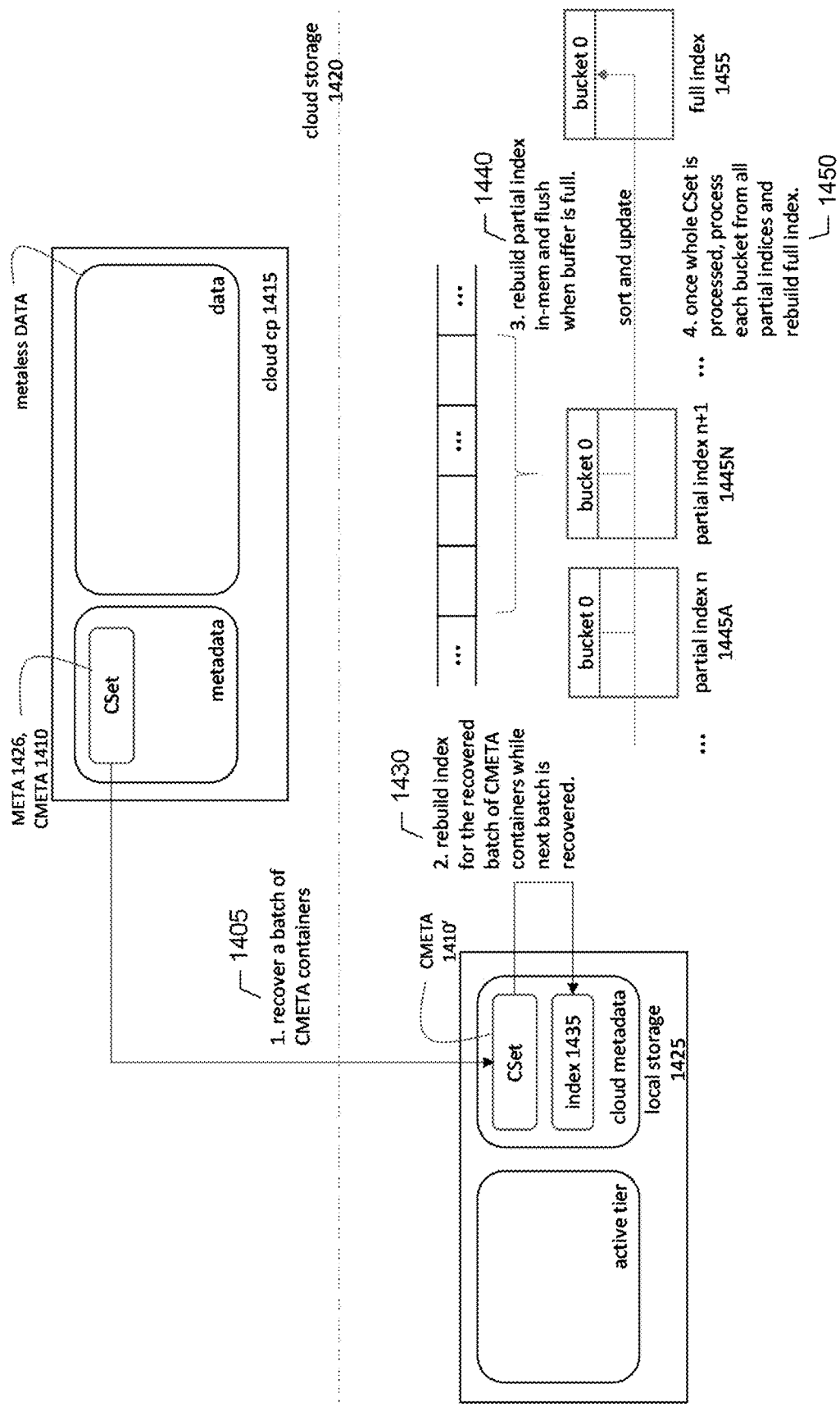
FIG. 14 shows an example of a parallel index rebuild, according to one or more embodiments.

FIG. 14 shows an example of a parallel index rebuild. An index, mapping a segment fingerprint with a corresponding container id, is maintained for each deduplication domain which is a collection partition. For the attach workflow, the index is rebuilt as CMETA containers are synced, parallelizing the operations. A range of container ids which have been synced to a local CSet is used to generate and populate partial index files. After CSet sync operation completes, and all partial files are rebuilt, a primary index file is generated by processing partial index files bucket by bucket. The entries for each bucket across partial indices are sorted before being updated in the full index to facilitate binary search during lookup. Parallelizing a batch of containers between CSet sync and index rebuild helps mitigate the time required for attachment. Alternatively, the full index can be directly rebuilt instead of having extra indirections through partial index files if space is not a constraint. Alternatively, an index copy can be maintained on the cloud unit, to be re-synced on the attach operation, rather than rebuilding it from CSet.

Referring now to FIG. 14, in a step 1405 a batch of CMETA containers 1410 associated with a particular cloud unit or cloud partition 1415 at cloud storage 1420 is recalled or recovered to local storage 1425 of a deduplicated storage appliance. As discussed, however, META containers 1426 are skipped. In a step 1430, an index is rebuilt for the recovered batch of CMETA containers 1410' while a next batch of CMETA containers are recovered from cloud storage to the local storage. Specifically, in a step 1440, a rebuild of partial indices 1445A-N is conducted. In a step 1450, once the whole CSet has been processed, each bucket is processed from all partial indices to rebuild a full index 1455. In at least one embodiment, the index functions as a hash table. Each item is associated with a unique key (e.g., fingerprint). The key is provided to a hash function which maps the key's hash value to a particular bucket or location where the item is stored.

In at least one embodiment, a method includes recalling from cloud storage a batch of cloud containers to a deduplicated storage appliance, the cloud containers including metadata from data containers and metadata from segment tree containers; rebuilding a first partial index from the batch of recalled cloud containers; and while the first partial index is being rebuilt, recalling a next batch of the cloud containers to rebuild a second partial index from the next batch of recalled cloud containers. These steps of recalling cloud containers in batches and rebuilding partial indices may be repeated until all cloud containers have been recalled. The batch processing of the cloud containers offers advantages over sequential processing including efficiency, resource optimization, reduced overhead, and improved scalability.

Figure 15:
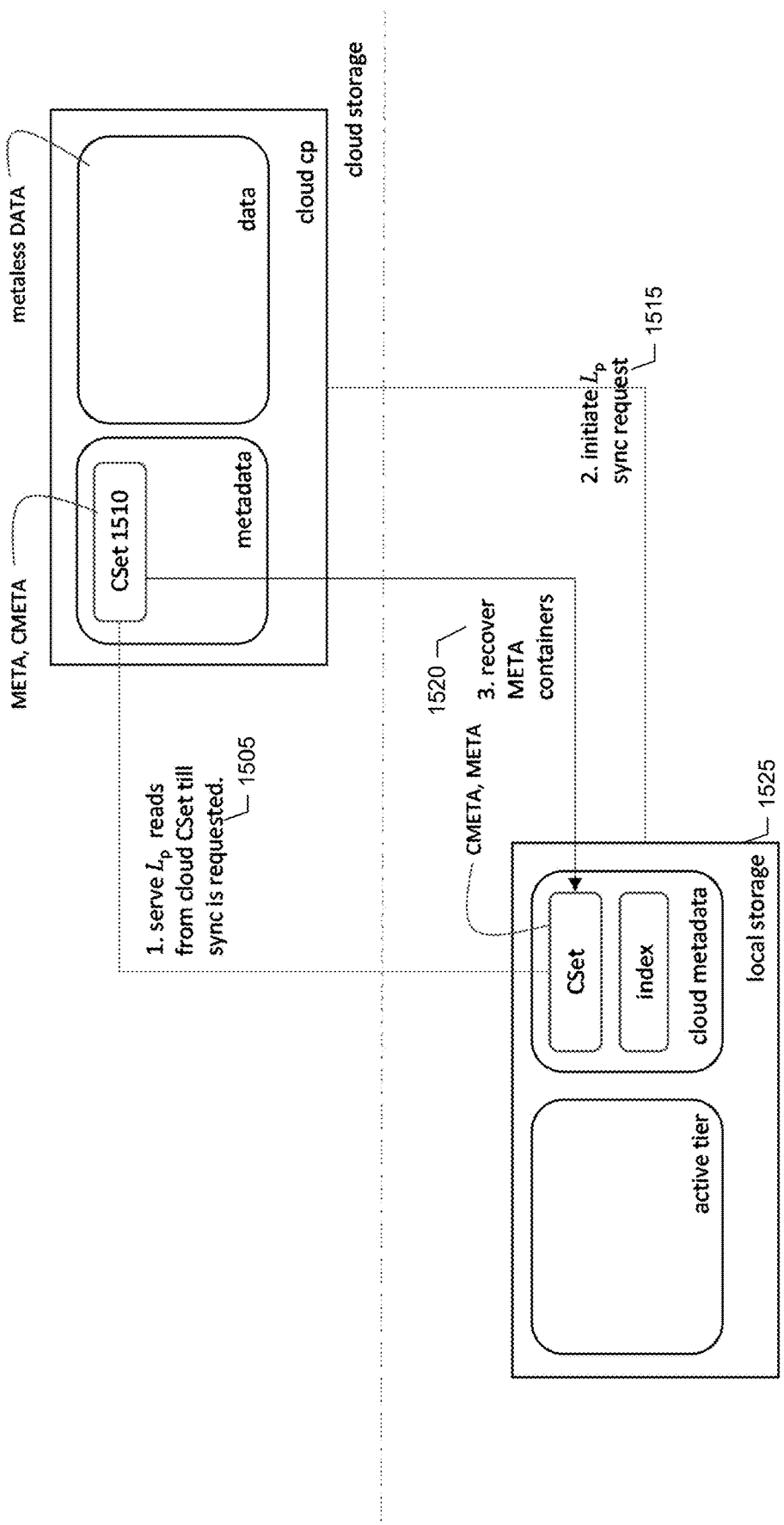
FIG. 15 shows an example of an Lp read from cloud and recovery, according to one or more embodiments.

FIG. 15 shows an example of a lazy Lp sync and read from cloud. In at least one embodiment, the skipped CONT_META Lp containers are synced after the CMETA sync and index rebuild completes. This mitigates the attach time, and any read request until the Lp sync can be facilitated by redirecting the read operation to cloud. Since, more than 95 percent of file segments can be L0 data segments, redirected cloud reads of Lp is not expected to incur a heavy cost. Once Lp is synced, the read can be served from the local CSet itself.

Specifically, in a step 1505 Lp reads are served from a cloud CSet 1510 until a sync is requested. In a step 1515, an Lp sync request responsive to the sync request is initiated. In a step 1520, META containers (e.g., Lp or segment tree containers) are recovered from the cloud CSet to local storage 1525.

In other words, in an embodiment, a lazy Lp sync refers to redirecting a request for Lp metadata to the cloud when the Lp metadata is not yet available locally at the storage appliance.

Figure 16:
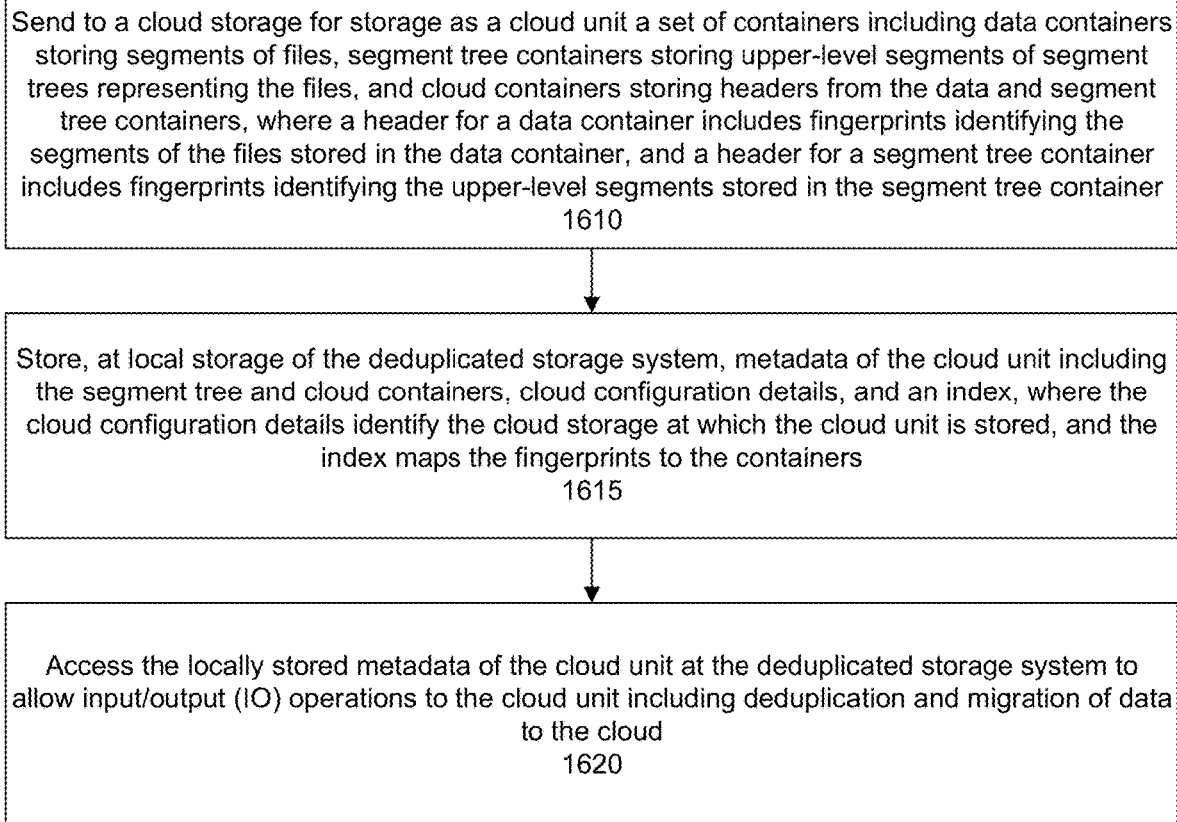
FIG. 16 shows a flow for handling IO involving a cloud tier in a metadata-data separated architecture of a deduplicated storage appliance, according to one or more embodiments.

FIG. 16 shows a flow for handling IO involving a cloud tier in a metadata-data separated architecture of a deduplicated storage appliance. In a step 1610, a set of containers are sent from the deduplicated storage appliance to a cloud storage for storage as a cloud unit. In at least one embodiment, the containers include data containers storing segments of files, segment tree containers (e.g., META or Lp containers) storing upper-level segments of segment trees representing the files, and cloud containers (e.g., CMETA containers) storing headers from the data and segment tree containers. A header for a data container includes fingerprints identifying the segments of the files stored in the data container. A header for a segment tree container includes fingerprints identifying the upper-level segments stored in the segment tree container.

In a step 1615, metadata of the cloud unit is stored at local storage of the deduplicated storage appliance. The metadata includes the segment tree containers (e.g., META or Lp containers), cloud containers (e.g., CMETA containers), cloud configuration details, and an index. The cloud configuration details identify the cloud storage at which the cloud unit is stored and the index maps the fingerprints to the containers in which segments corresponding to the fingerprints are stored.

In a step 1620, the locally stored metadata at the deduplicated storage appliance of the cloud unit is accessed to allow IO operations to the cloud unit including deduplication and migration of data to the cloud. As an example, consider that a file at the deduplicated storage appliance is eligible for migration to the cloud. It is quite possible that portions of the file may already exist at the cloud. Thus, to reduce the amount of redundant data that is sent over the network to the cloud, a deduplication operation is performed. The deduplication operation includes dividing the file into segments, calculating fingerprints of the segments, and comparing the fingerprints to fingerprints of segments already present in the cloud. Metadata including the fingerprints of segments already present in the cloud is stored locally at the deduplicated storage appliance so that reading the fingerprints can be performed locally at the deduplicated storage appliance, rather than from the cloud. Segments having matching fingerprints (i.e., redundant segments) are not sent to the cloud. Segments not having matching fingerprints (i.e., non-redundant segments) are sent to the cloud.

Figure 17:
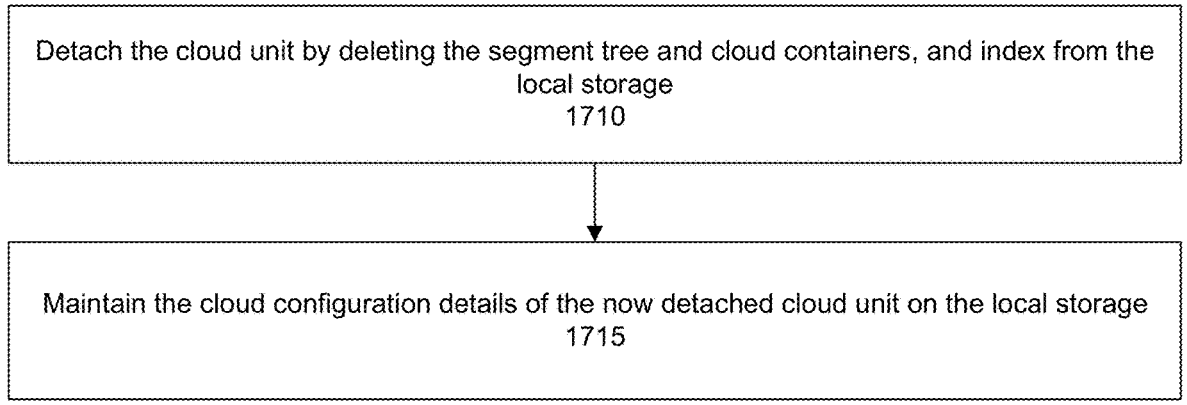
FIG. 17 shows a flow for detaching a cloud unit, according to one or more embodiments.

FIG. 17 shows a flow for detaching a cloud unit. In a step 1710, a cloud unit is detached by deleting from local storage of the deduplicated storage appliance the segment tree containers (e.g., META or Lp containers), cloud containers (e.g., CMETA containers), and index. The deletion frees up storage space for metadata of a new cloud unit.

As discussed, in at least one embodiment, a cloud unit that has been detached is unavailable for immediate IO operations. Detaching a cloud unit may be performed upon a request from a user or when a new cloud unit is to be added or attached to the deduplicated storage appliance, but local metadata storage for metadata of the new cloud unit has reached or is at capacity.

For example, when a user attempts to add, create, or attach a new cloud unit, but there is no metadata space on the deduplicated storage appliance for the new cloud unit, a message may be displayed indicating that the new cloud unit cannot be attached until a cloud unit currently attached is detached. In at least one embodiment, the deduplicated storage appliance prompts the user to select a cloud unit to detach. In another embodiment, the deduplicated storage appliance automatically selects a cloud unit to detach. For example, the deduplicated storage appliance may select from among a set of cloud units currently attached, a cloud unit that has not been recently accessed. In other words, the cloud unit having the oldest last access time may be selected for detachment.

In a step 1715, cloud configuration details associated with the cloud unit, however, are maintained, kept, or retained in local storage of the deduplicated storage appliance. This allows for later attachment of the cloud unit back to the deduplicated storage appliance.

Figure 18:
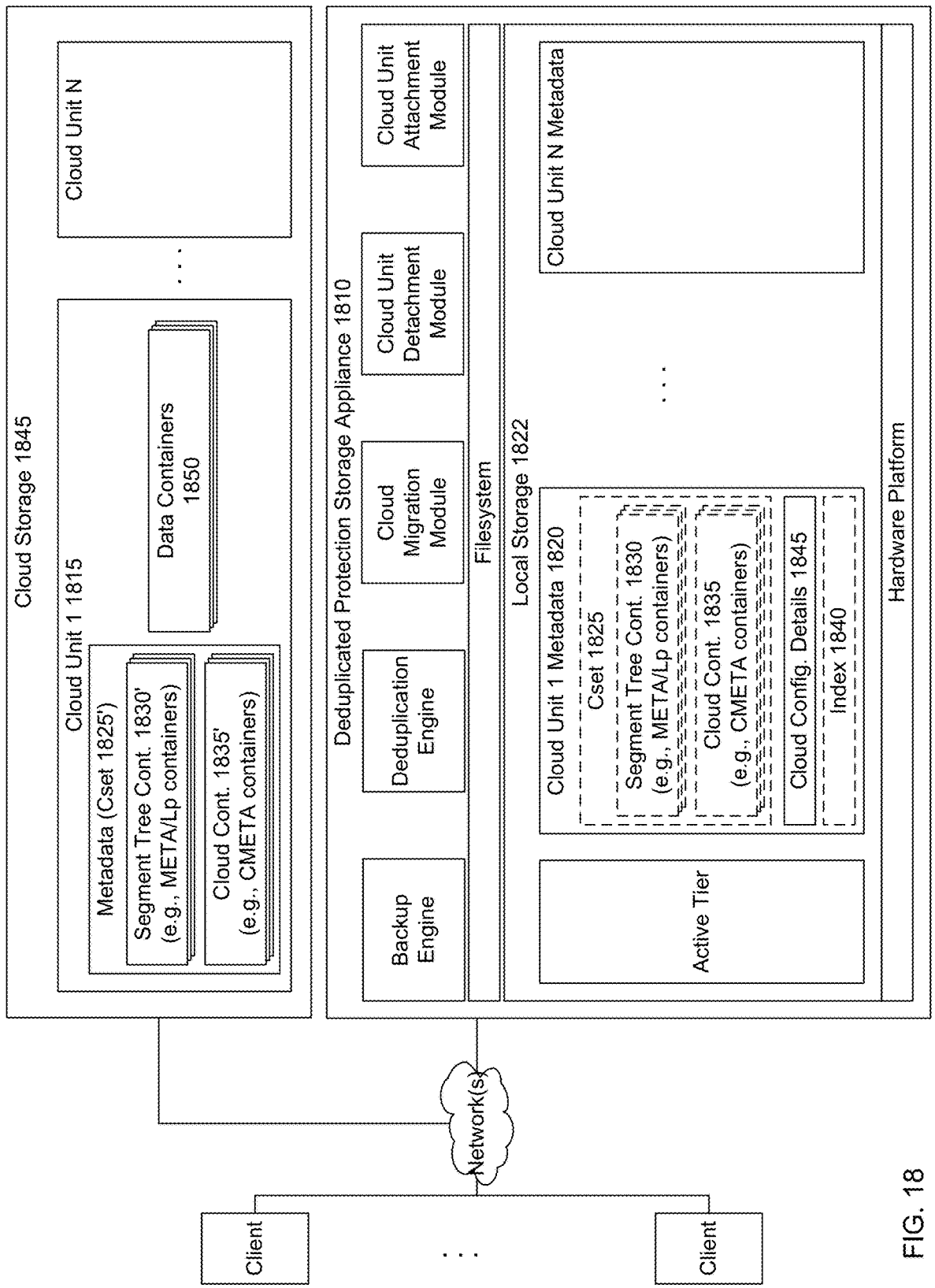
FIG. 18 shows an example of a state of a deduplicated storage appliance after detaching a cloud unit, according to one or more embodiments.

FIG. 18 shows a block diagram of a state of a deduplicated storage appliance 1810 after detaching a cloud unit 1815. FIG. 18 is similar to FIG. 1. In the example of FIG. 18, however, a portion of cloud unit metadata 1820 previously residing at local storage 1822 is shown in broken lines to indicate that the information has been deleted as part of the detachment operation. That is, CSet 1825, including segment tree containers 1830 (e.g., META containers or Lp containers) and cloud containers (e.g., CMETA containers) 1835, and index 1840 have been deleted from local storage of the deduplicated storage appliance. Cloud configuration details 1845, however, are maintained at the deduplicated storage appliance so that the now detached cloud unit can be attached back at a later time if needed (and local metadata storage space permits).

As shown in example of FIG. 18, at least a portion of the cloud unit metadata deleted from local storage of the deduplicated storage appliance remains stored or saved on cloud storage. Specifically, cloud storage 1845 includes a copy of CSet 1825', including a copy of segment tree containers 1830' (e.g., META containers or Lp containers) and a copy of cloud containers (e.g., CMETA containers) 1835', in addition to data containers 1850. In at least one embodiment, however, the index is not saved on cloud storage as the index can be rebuilt using the metadata information stored with the cloud containers. Not saving the index helps to reduce storage costs. Not saving the index, however, is optional and a customer user may instead opt to save the index. Saving the index can speed a future attachment of the cloud unit back to the deduplicated storage appliance because the index will not require rebuilding.

FIG. 19 shows a flow for attaching a cloud unit that has been detached back to the deduplicated storage appliance. In a step 1910, cloud configuration details maintained in local storage at the deduplicated storage appliance are consulted, examined, or reviewed to access the cloud unit in cloud storage. As discussed, the cloud configuration details identify the cloud unit, particular cloud storage provider, and include other information necessary to access the cloud unit from cloud storage as provided by the cloud storage provider.

In a step 1915, the cloud unit is marked as being in a transient state of attachment.

In a step 1920, recovery of the cloud containers (e.g., CMETA containers) from the cloud unit in cloud storage to local storage of the deduplicated storage appliance is prioritized over the segment tree containers (e.g., META or Lp containers). That is, segment tree containers are skipped or passed over when there are cloud containers to recover. Cloud containers are recovered before segment tree containers. Segment tree containers may or may not be recovered after cloud containers have been recovered. Prioritizing recovery of the cloud containers allows for rebuilding the index in parallel using the metadata information stored in the cloud containers.

Specifically, in a step 1925, while the cloud containers are being recovered or syncd back to the storage appliance, the index is rebuilt from the cloud containers that have been recovered. Recovery of the cloud containers can take several days (e.g., two or three days) depending upon the amount of data, network bandwidth, and other factors. As discussed, the cloud containers include metadata section headers from the data containers and segment tree containers. In at least one embodiment, the metadata section headers include segment identifiers corresponding to segments (e.g., data segments or Lp segments), and container identifiers corresponding to containers (e.g., data containers or segment tree containers) in which the segments are stored. This metadata information allows for rebuilding the index.

In at least one embodiment, batch processing is used for the recovery of the cloud containers and rebuilding of the index. In at least one embodiment, a first subset of cloud containers is recovered from cloud storage to local storage of the deduplicated storage appliance. A first partial index is rebuilt from cloud containers in the first subset. For example, the identifiers, keys, or fingerprints and container ids stored in the cloud containers may be copied into the first partial index. While the first partial index is being rebuilt, a second subset of cloud containers is recovered from cloud storage to local storage of the deduplicated storage appliance. This process of recovering the cloud containers in batches and rebuilding partial indexes can continue until all cloud containers have been recovered. In at least one embodiment, a full index is then built from the partial indices. The partial indices may be merged or combined to make a full index.

In a step 1930, upon receipt of a request to access a segment tree container of the cloud unit that has yet to be recovered, the request is redirected to the cloud storage. In at least one embodiment, after the cloud containers have been recovered or syncd, the segment tree containers (e.g., META containers or Lp containers) are then recovered from cloud storage to local storage of the deduplicated storage appliance.

In some cases, however, it is not necessary to recall or recover the segment tree containers. For example, in cases where a cloud unit is to be maintained in a read-only state, recalling or recovering the segment tree containers is not necessary as requests for Lp reads can continue to be redirected to the cloud. In other cases, when a cloud unit is to be made available in a read-write state, the segment tree containers are recalled. This allows for new ingestion of data and writes to the segment trees. Further discussion is provided below.

Figure 20:
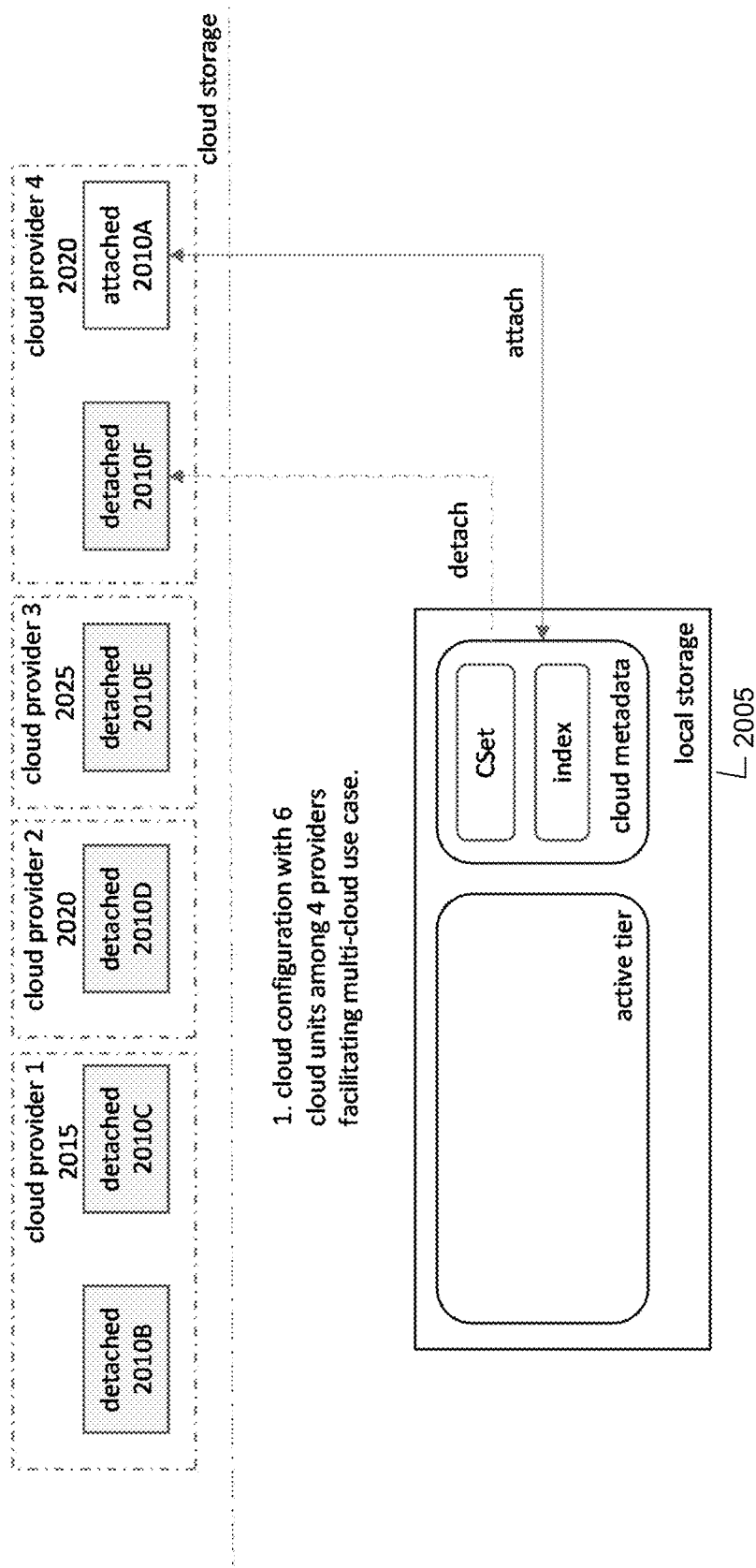
FIG. 20 shows a block diagram of a multi-cloud use case, according to one or more embodiments.

FIG. 20 shows a block diagram illustrating a multi-cloud use case. In at least one embodiment, the described systems and techniques provide an opportunity to enhance a multi-cloud experience with detach-attach workflows, where multiple cloud units from different cloud providers and of different storage classes can be configured on the same deduplication system without any additional metadata space requirement. This offers flexibility to the end-user by avoiding cloud provider vendor locking.

In the example of FIG. 20, local storage 2005 of a deduplicated storage appliance is sized to support at most a limited number of cloud units, such as a single cloud unit 2010A. Nonetheless, a cloud configuration associated with the deduplicated storage appliance includes six cloud units 2010A-F. The configuration is possible because cloud units 2010B-F are in a detached or offline state while only cloud unit 2010A is in an attached or online state. Metadata associated with the detached cloud units including the CSet (e.g., cloud or CMETA containers and segment tree or META containers) and index are not present at the deduplicated storage appliance and thus are not consuming any storage space at the deduplicated storage appliance.

Cloud units 2010B-F are not immediately accessible for reads or other IO operations, but can still be recalled (assuming space is made available at the storage appliance). The detach-attach workflows allow for swapping out or exchanging local metadata space required for a first cloud unit with metadata space required for a second cloud unit, while still preserving an ability to later recall the first cloud unit.

Further, as shown in the example of FIG. 20, the customer user has the flexibility to use any number of different cloud providers for cloud unit storage. For example, cloud units 2010B,C are at a first cloud provider 2015; cloud unit 2010D is at a second cloud provider 2020; cloud unit 2010E is at a third cloud provider 2025; and cloud units 2010F,A are at a fourth cloud provider 2030.

Below are some benefits of the systems and techniques described herein.
1) Scaling capacity on the cloud tier seamlessly while keeping an efficient deduplication ratio without any additional compute and local storage cost.
2) Selective CSet sync with CMETA only recovery speeds up an attach operation.
3) Parallelizing CMETA sync and index rebuild reduces recovery time.
4) The lazy Lp sync and Lp read from cloud provides for a faster attach workflow.
5) Traditionally, recovery operations require downtime, in contrast, the systems and techniques described herein can perform all the operations online, thus avoiding system downtime.
6) Enhancement of the multi-cloud experience with cost-effective flexibility to attach desired provider and storage class.

Figure 21:
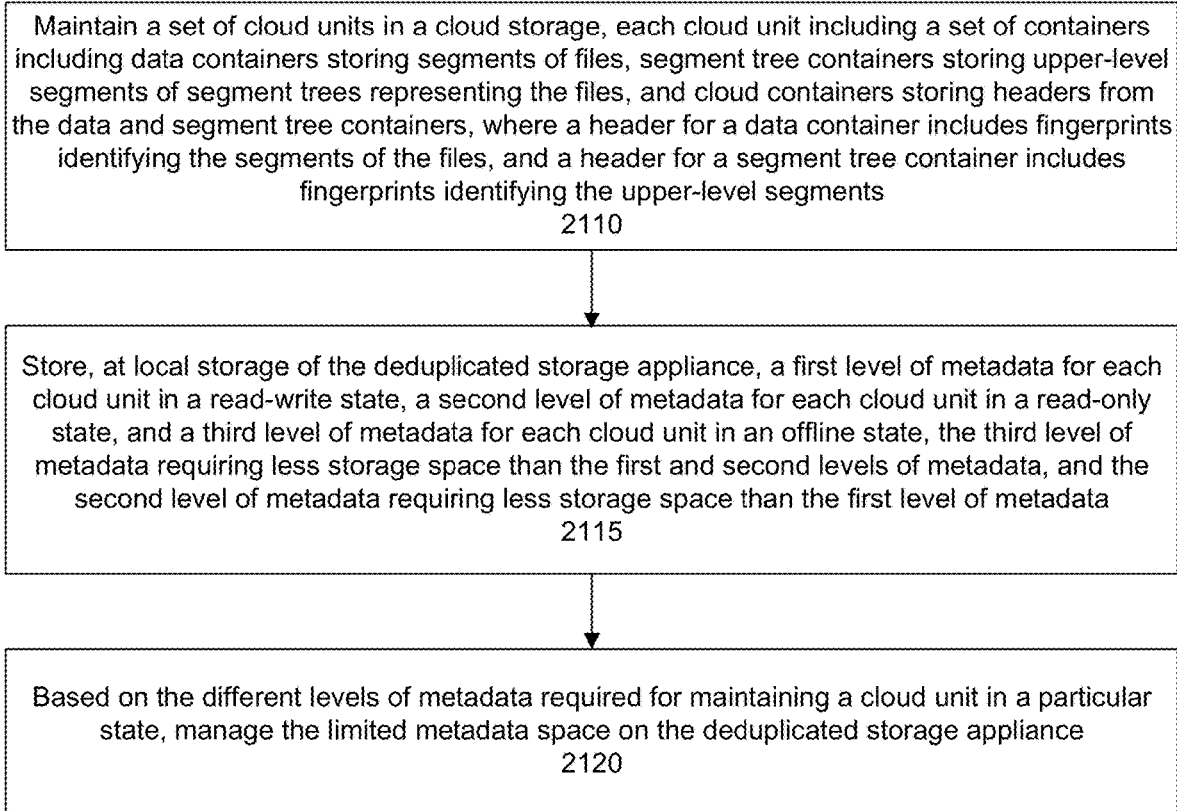
FIG. 21 shows a flow of another technique for cloud capacity scaling and managing the limited metadata space that may accompany a deduplicated storage appliance, according to one or more embodiments.

FIG. 21 shows a flow of another technique for cloud capacity scaling and managing the limited metadata space that may accompany a deduplicated storage appliance. As discussed, in at least one embodiment, a cloud unit that has been detached is in an offline state and is not immediately accessible for either read or write operations. In another embodiment, however, one or more cloud units are maintained in a read-only state. The amount of metadata required to maintain a cloud unit in the read-only state is greater than the amount of metadata required for a cloud unit in an offline state, but is still much less than the amount of metadata required to maintain a cloud unit in a read-write state.

In a step 2110, a set of a cloud units are maintained in a cloud storage. As discussed, each cloud unit includes a set of containers including data containers storing segments of files, segment tree containers (e.g., META or Lp containers) storing upper-level segments of segment trees representing the files, and cloud containers (e.g., CMETA containers) storing headers from the data and segment tree containers, where a header for a data container includes fingerprints identifying the segments of the files, and a header for a segment tree container includes fingerprints identifying the upper-level segments.

In a step 2115, local storage of a deduplicated storage appliance stores a first level of metadata for each cloud unit in a read-write state, a second level of metadata for each cloud unit in a read-only state, and a third level of metadata for each cloud unit in an offline state. The third level of metadata requires less storage space than the first and second levels of metadata. The second level of metadata requires less storage space than the first level of metadata.

In an embodiment, each level of metadata includes cloud configuration details of a corresponding cloud unit in cloud storage. The first level of metadata includes segment tree containers, cloud containers, and an index mapping fingerprints to containers. The second level of metadata does not include the segment tree containers, but includes the cloud containers and index. The third level of metadata does not include the segment tree containers, cloud containers, or index.

In a step 2120, based on the different levels of metadata required for maintaining a cloud unit in a particular state, the limited metadata space on the deduplicated storage appliance is managed. For example, in at least one embodiment, all cloud units that are detached are maintained in a read-only state. This allows immediate read-only access to each cloud unit. In various other embodiments, one or more cloud units may be maintained in an offline state, one or more other cloud units may be maintained in a read-only state, one or more other cloud units may be maintained in a read-write state, or combinations of these.

As discussed, in at least one embodiment, a deduplication system includes a metadata-data separated architecture, where metadata is stored locally on a faster tier of storage, such as SSDs or HDDs, and data is stored on a low-cost tier such as a cloud, thus achieving efficient de-duplication both in terms of transaction cost and performance. Increasing cloud capacity can require an increase in local metadata storage. In at least one embodiment, a cost effective solution uses a detach-attach workflow to provide cloud capacity scaling without scaling metadata space, but the detached cloud units are made offline and are not accessible for read or write. In another embodiment, a high-read availability architecture provides read availability for 100 percent of cloud capacity for a predefined number of cloud units at a low additional requirement of metadata space. In another embodiment, for "infinite" or high-scaling, a hybrid architecture is provided that involves offline and read-only units where a predefined subset of cloud units will always have read access availability, while the rest or remainder of the cloud units will be offline.

In at least one embodiment, all the detached cloud units are made read-only to have 100 percent cloud read availability. In an embodiment, this includes predefined sizing of cloud metadata space on local storage to facilitate retention of partial metadata corresponding to read-only cloud units in addition to full cloud metadata corresponding to read-write cloud units. The retention of partial metadata instead of full metadata lowers the additional metadata space requirement. In this approach, META containers are cleaned up from a local CSet but CMETA containers are retained in addition to the index and cloud configuration during cloud unit detach, making it read-only (as META reads are served from cloud) until it is attached back and corresponding metadata is re-synced making it read-write.

In at least one embodiment, the "detach" operation cleans up the CSet with META containers corresponding to a detaching unit while retaining CMETA containers and the index. Additionally, cloud unit configuration such as cloud identity, stats, state, and so forth are retained in memory in addition to disk. After the detach operation, the cloud unit is marked as read-only, where the META container reads are served from the cloud. As the META reads are low in number compared to CMETA reads, the cloud read cost is expected to be minimal. Since it is desirable that capacity scaling be accomplished with minimum disruption and no filesystem downtime, the operation is performed while the filesystem is online.

Figure 22:
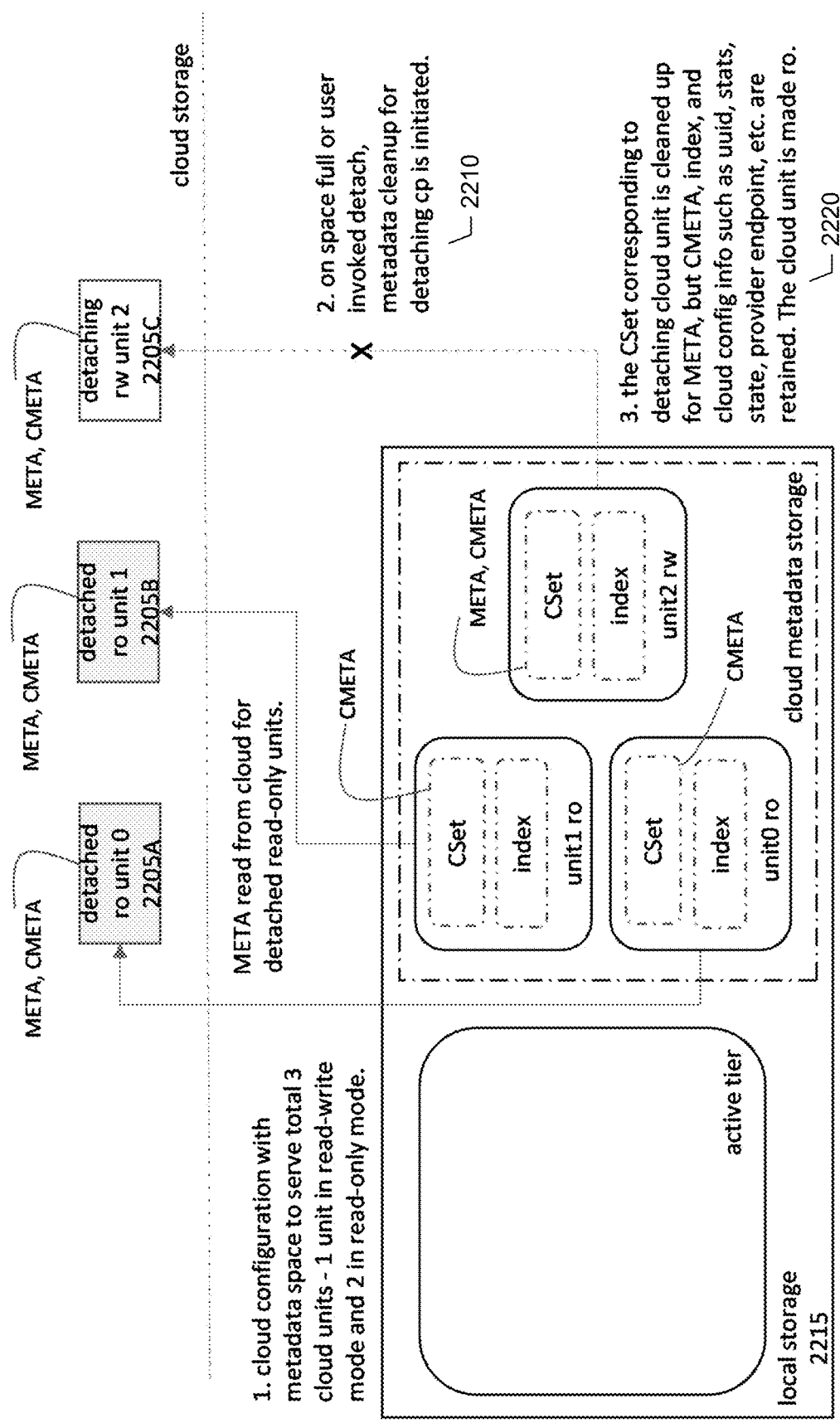
FIG. 22 shows a block diagram of a detach operation in an architecture having high readable cloud capacity, according to one or more embodiments.

FIG. 22 shows a block diagram of an architecture having high-readable cloud capacity. The example shown in FIG. 22 includes a cloud configuration with metadata space to serve three cloud units 2205A-C including one cloud unit in a read-write mode and two cloud units in a read-only mode. In a step 2210, when metadata space on local storage 2215 has become full (or upon a user invoked detach), a metadata cleanup for a detaching cloud unit (or collection partition (cp)) is initiated. In a step 2220, a CSET corresponding to a detaching cloud unit is cleaned up for META, but not CMETA, index, and cloud configuration details such as UUID, stats, state, provider endpoint, and so forth as this information is retained. The cloud unit is rendered read-only (RO) or placed into a read-only state.

Figure 23:
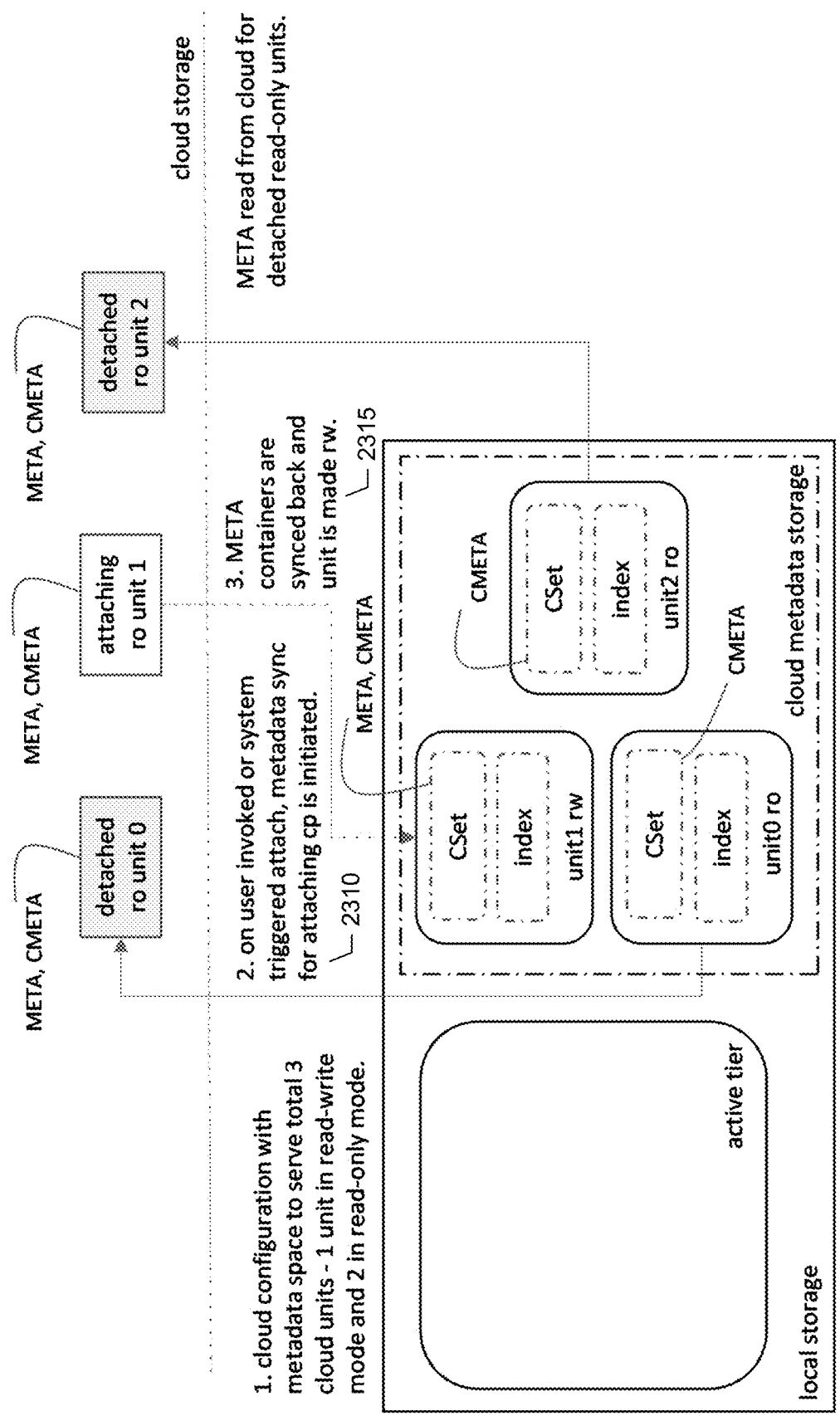
FIG. 23 shows a block diagram of an attach operation, according to one or more embodiments.

FIG. 23 shows an example of an attach operation. FIG. 23 is similar to FIG. 22. In a step 2310, however, on a user invoked or system triggered attach operation, metadata is re-synced back from cloud to make a read-only cloud unit read-write. The attach operation abides by the cap set for a maximum number read-write cloud units. In a step 2315, as part of attach, the META containers are re-synced to a local CSet. Since the index is not cleaned up during detach, there is no need to rebuild it. Entirety of attach operation is performed while filesystem is online, without any impact or downtime of other read-write or read-only cloud units. During attach operation the cloud unit being attached is marked to be in transient "attaching" state to handle any access request. After attach operation completion the cloud unit is marked as read-write.

Figure 24:
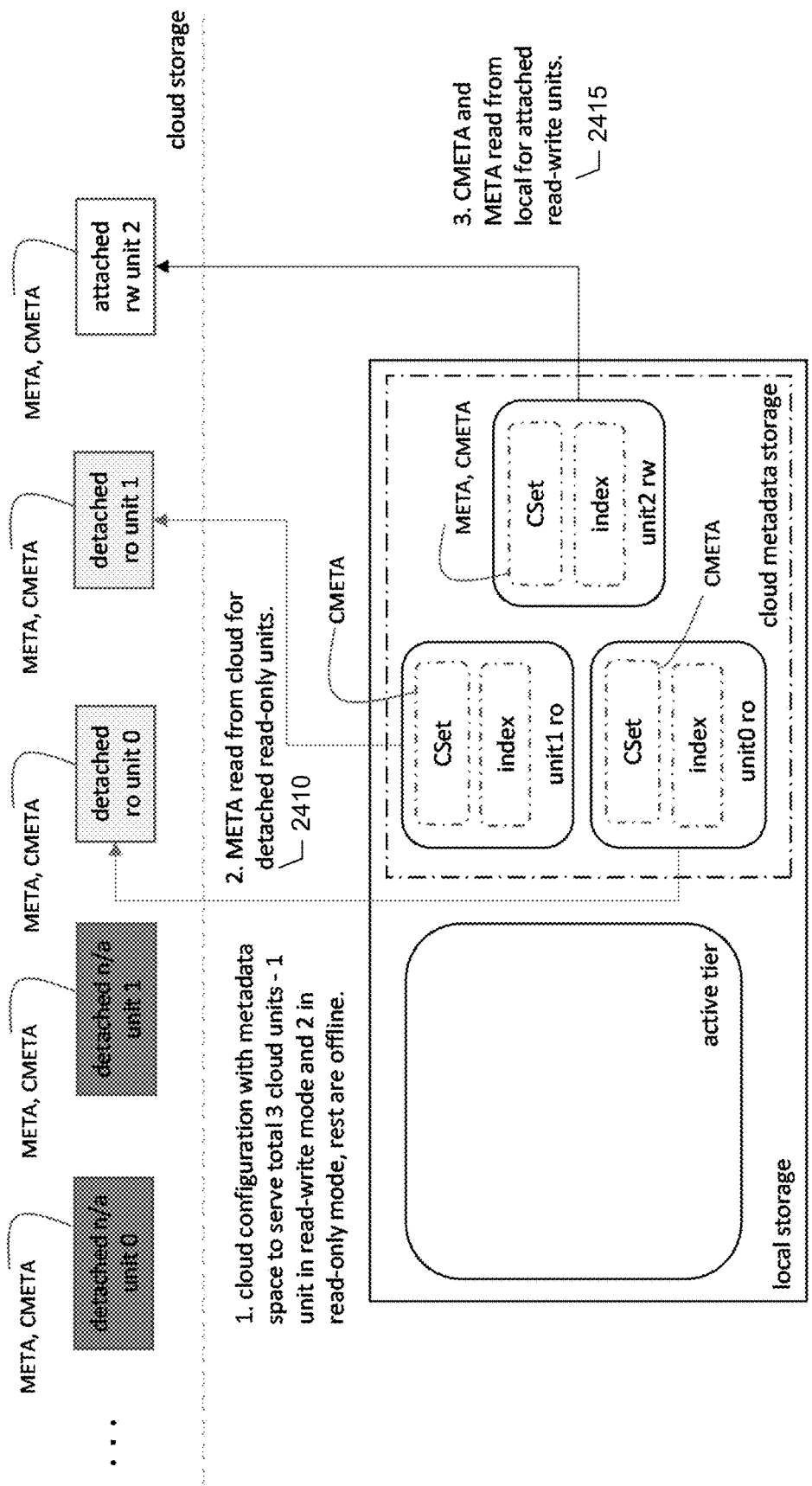
FIG. 24 shows a block diagram of an architecture supporting "infinite" or high scaling of cloud units, according to one or more embodiments.

FIG. 24 shows a block diagram of an architecture supporting "infinite" or high scaling where a subset of cloud units are in a read-only state. This example shows "infinite" cloud capacity scaling with high cloud read availability. In this architecture, in at least one embodiment, out of all "n" cloud units in the cloud tier, majority of cloud units "x" are made offline (such that x<n), a subset "y" is kept read-only (such that y<x<n), and a subset "z" is kept read-write (such that z<y<x<n). This approach enables "infinite" scaling with a predefined subset of cloud units in read-only mode in addition to the subset of cloud units in read-write mode. In at least one embodiment, the technique includes predefined sizing of cloud metadata space on local storage to facilitate the retention of partial metadata corresponding to read-only cloud units in addition to full cloud metadata corresponding to read-write cloud units. The retention of partial metadata instead of full metadata lowers the additional metadata space requirement.

In at least one embodiment, the detach attach operations, by default, accounts for the state of cloud unit being processed. Specifically, an offline cloud unit, on attach, is made read-only, whereas a read-only unit is made read-write. Similarly, a read-write unit, on detach, is made read-only, whereas a read-only unit is made offline. All operations abide by the predefined cap on read-only and read-write count and the user can override the operations to skip an intermediate state. For example, on user override, the offline cloud unit can be directly made read-write and vice versa, again abiding by the cap by the predefined cap on read-only and read-write count of cloud units.

The example shown in FIG. 24 includes a cloud configuration with metadata space to serve three cloud units including one cloud unit in a read-write mode, two cloud units in a read-only mode, and the remaining cloud units in an offline mode. In a step 2410, META reads are performed from any cloud for detached read-only units. In a step 2415, CMETA and META reads are performed locally for attached read-write cloud units.

In an embodiment, a method of scaling capacity in a deduplicated storage appliance comprises configuring the appliance with a fixed amount of metadata space; maintaining a plurality of cloud units in a cloud storage, each cloud unit comprising a plurality of containers comprising data containers storing segments of files, segment tree containers storing upper-level segments of segment trees representing the files, and cloud containers storing headers from the data and segment tree containers, wherein a header for a data container comprises fingerprints identifying the segments of the files, and a header for a segment tree container comprises fingerprints identifying the upper-level segments; storing, at local storage of the deduplicated storage appliance, a first level of metadata for each cloud unit in a read-write state, a second level of metadata for each cloud unit in a read-only state, and a third level of metadata for each cloud unit in an offline state, the third level of metadata requiring less storage space than the first and second levels of metadata, and the second level of metadata requiring less storage space than the first level of metadata; and adjusting one or more of a number of cloud units in the read-write state, a number of cloud units in the read-only state, or a number of cloud units in the offline state according to the fixed amount of metadata space.

The method may include: detecting that the fixed amount of metadata space does not have space to support a particular cloud unit in a particular state; selecting a cloud unit having a read-write state or read-only state to detach; and conducting a detachment operation on the cloud unit to make space available for supporting the particular cloud unit in the particular state. The selection may be based on a time indicating when the cloud unit was last accessed where a cloud unit having the oldest last access time is selected for the detachment operation.

The method may include detecting that the fixed amount of metadata space has space to support a cloud unit in a particular state; selecting a cloud unit; and conducting an attachment operation on the selected cloud unit to place the selected cloud unit in the particular state. For example, at some point there may be metadata space available on the deduplicated storage appliance to support a cloud unit in a read-only state. In this case, a cloud unit in an offline state may be selected to be placed into a read-only state. The selection may be based on when a cloud unit was placed into the offline state. For example, a cloud unit most recently placed into the offline state may be selected for the attachment operation to place the cloud unit into a read-only state.

The selection of a cloud unit for an attachment or detachment operation may be based on any number of criteria including time and date the cloud unit was last accessed, cloud storage provider hosting the cloud unit, size of the cloud unit, name or identifier of the cloud unit, category of files stored with the cloud unit, organizational department associated with the cloud unit, storage class associated with the cloud unit, priority designation associated with the cloud unit, criticality associated with the cloud unit, or combinations of these.

In an embodiment, a method of scaling capacity in a deduplicated storage appliance includes: sizing the appliance to support a first number of cloud units in an offline state, a second number of cloud units in a read-only state, and a third number of cloud units in a read-write state, wherein the third number is less than the first and second numbers, and the second number is less than the first number; and conducting detach and attach operations to maintain a balance of cloud units in the offline state according to the first number, a balance of cloud units in the read-only state according to the second number, and a balance of cloud units in the read-write state according to the third number.

In at least one embodiment, operations including selecting a cloud unit for detachment, selecting a cloud unit for attachment, attachment operations, detachment operations, monitoring metadata space on local storage of the appliance, detecting lack of available metadata space, and others are performed dynamically or automatically (e.g., without user involvement). In at least one embodiment, techniques including artificial intelligence (AI), machine learning (ML), deep learning, and the like may be used to automate one or more processes and decision making.

Figure 25:
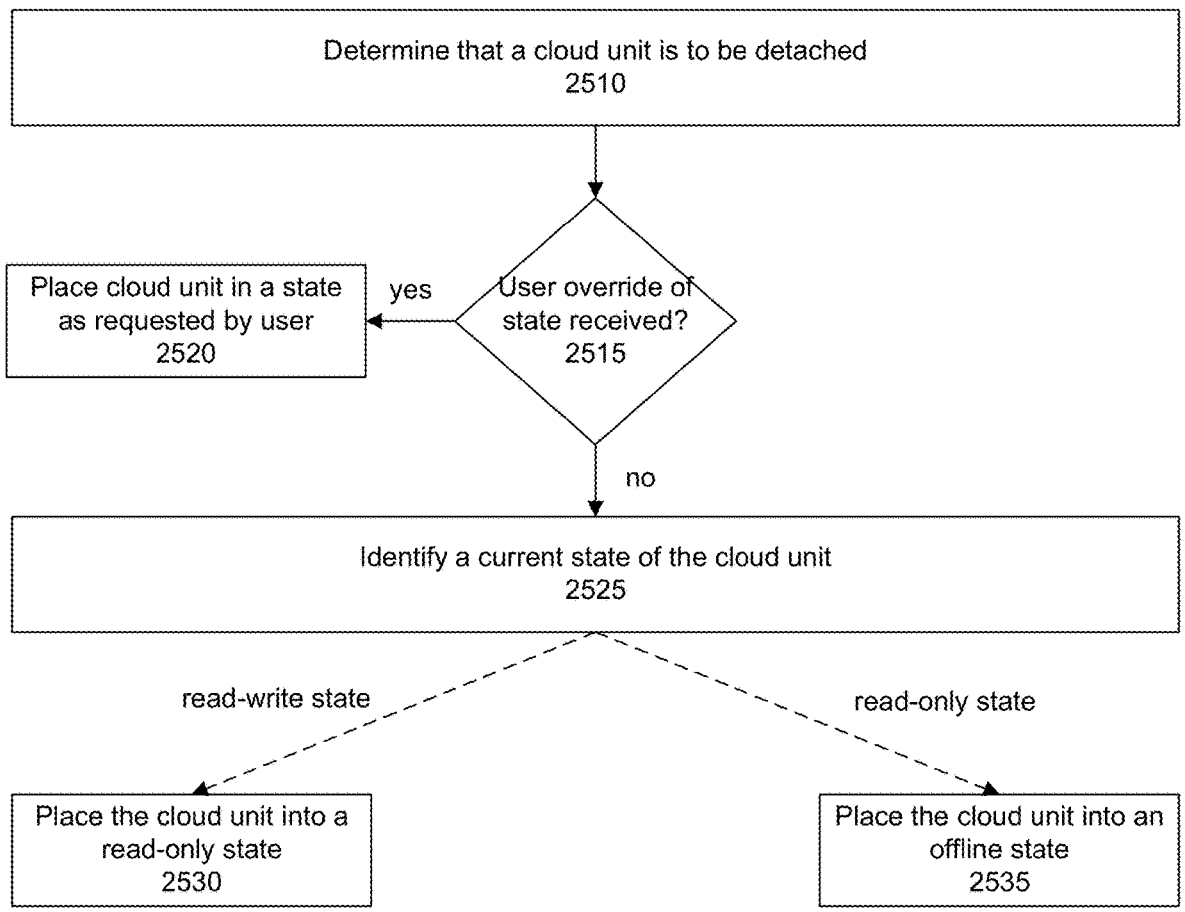
FIG. 25 shows another flow for detaching a cloud unit, according to one or more embodiments.

FIG. 25 shows a flow for detaching a cloud unit according to one or more embodiments. As discussed, in at least one embodiment, a cloud unit can be in a read-write state, a read-only state, or an offline state. Detaching a cloud unit changes a state of the cloud unit. In a default configuration, detaching a cloud unit in a read-write state places the cloud unit in a read-only state. Detaching a cloud unit in a read-only state places the cloud unit in an offline state. Thus, in at least one embodiment, detaching a cloud unit follows a predefined stepped progression or series of states.

For example, in a step 2510, a determination is made that a cloud unit is to be detached. The determination may be based on detecting that cloud unit metadata space on local storage of the deduplicated storage appliance has reached capacity. Alternatively, the determination may be based on having received a request from the user to detach a cloud unit.

In a step 2515, a determination is made as to whether a user has specified a state. If so, in a step 2520, the cloud unit is placed into a state as requested by the user.

Alternatively, if the user has not specified a state, in a step 2525, a current state of the cloud unit is identified. If the current state of the cloud unit is in a read-write state, the cloud unit is placed into a read-only state (step 2530). If the current state of the cloud unit is in a read-only state, the cloud unit is placed into an offline state (step 2535).

Figure 26:
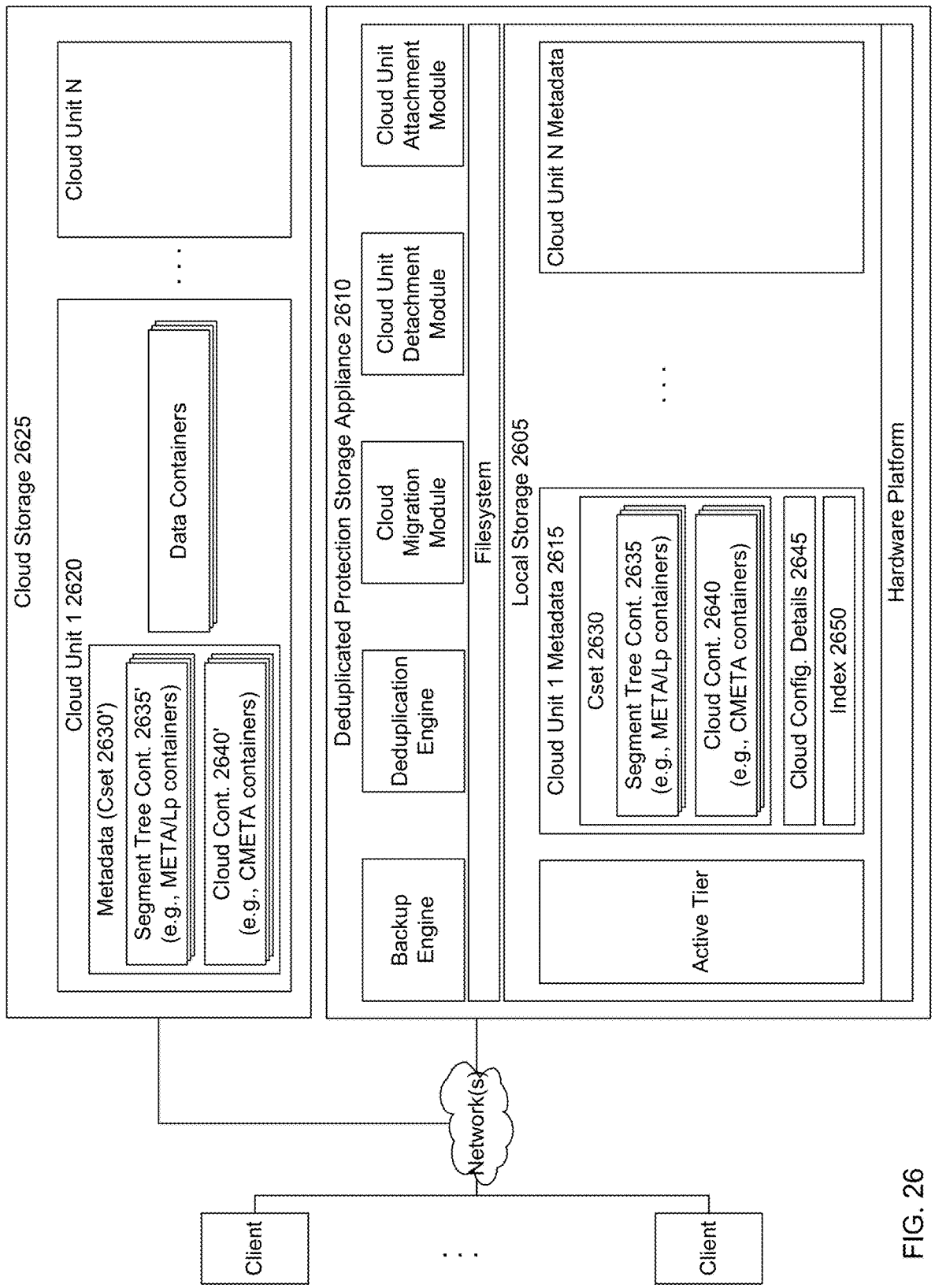
FIG. 26 shows an example of a system having a cloud unit in a read-write state, according to one or more embodiments.

FIG. 26 shows an example of a system having a cloud unit in a read-write state. Specifically, local storage 2605 of a deduplicated storage appliance 2610 stores cloud metadata 2615 associated with a cloud unit 2620 in a cloud storage 2625. The cloud metadata at local storage includes CSet 2630 including segment tree containers 2635, cloud containers 2640, cloud configuration details 2645, and an index 2650. A copy of the CSet 2630' resides with the cloud unit in cloud storage including a copy of the segment tree containers 2635' and a copy of the cloud containers 2640'.

Figure 27:
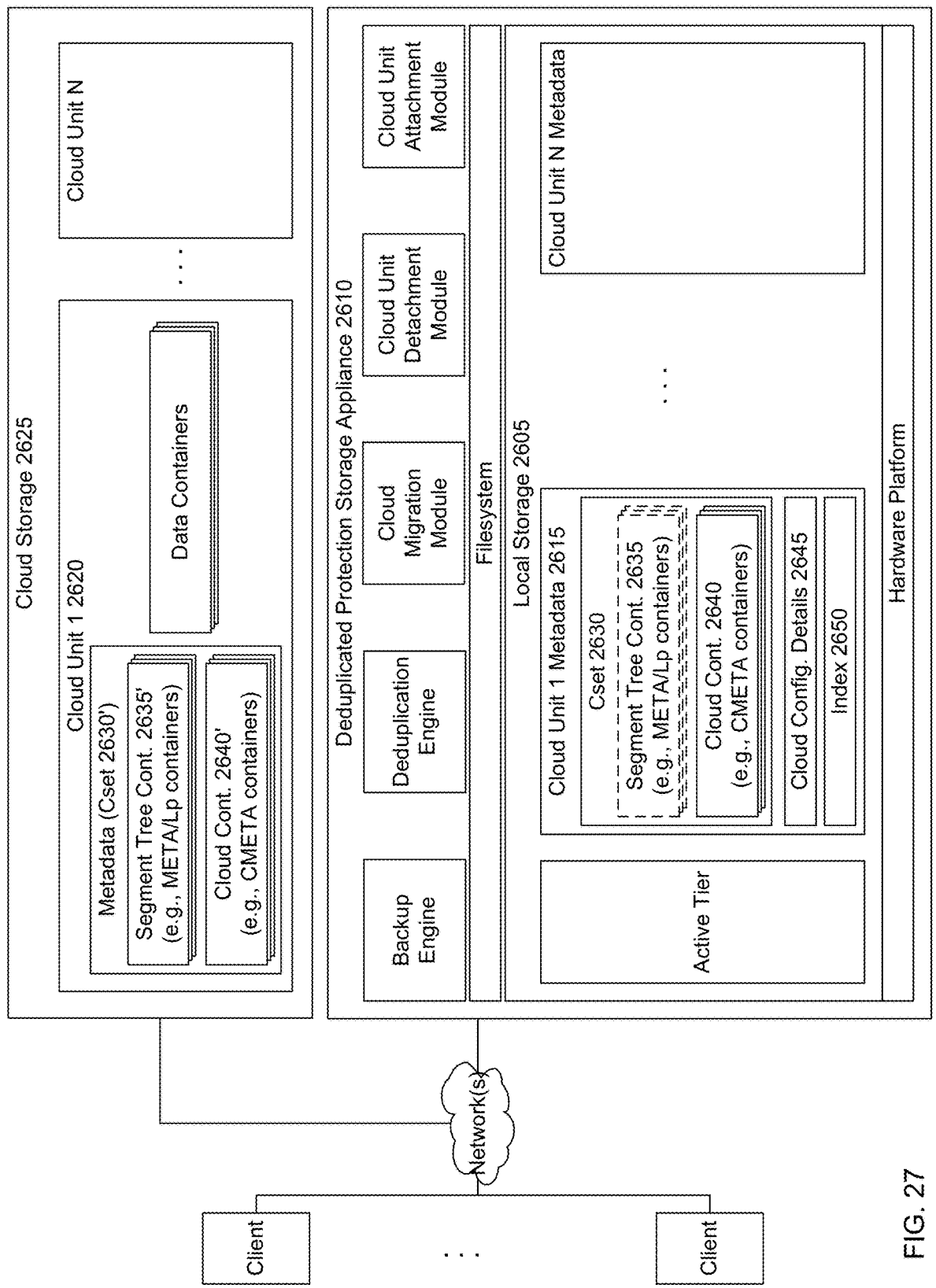
FIG. 27 shows an example of the system shown in FIG. 26 after a detachment operation places the cloud unit into a read-only state, according to one or more embodiments.

FIG. 27 shows an example of the cloud unit in FIG. 26 after a detachment operation places the cloud unit into a read-only state from a read-write state. In the example of FIG. 27, a portion of cloud metadata at the local storage of the deduplicated storage appliance has been deleted thereby making space available for other cloud metadata. Specifically, segment tree containers 2635 at the local storage are shown in broken lines to indicate that they have been deleted. Cloud containers 2640 and index 2650, however, are retained in local storage to allow reads of cloud unit 2620. Requests to access the segment tree are redirected to the cloud unit in cloud storage. Cloud configuration details 2645 are retained in local storage to allow the cloud unit to be later attached back.

Figure 28:
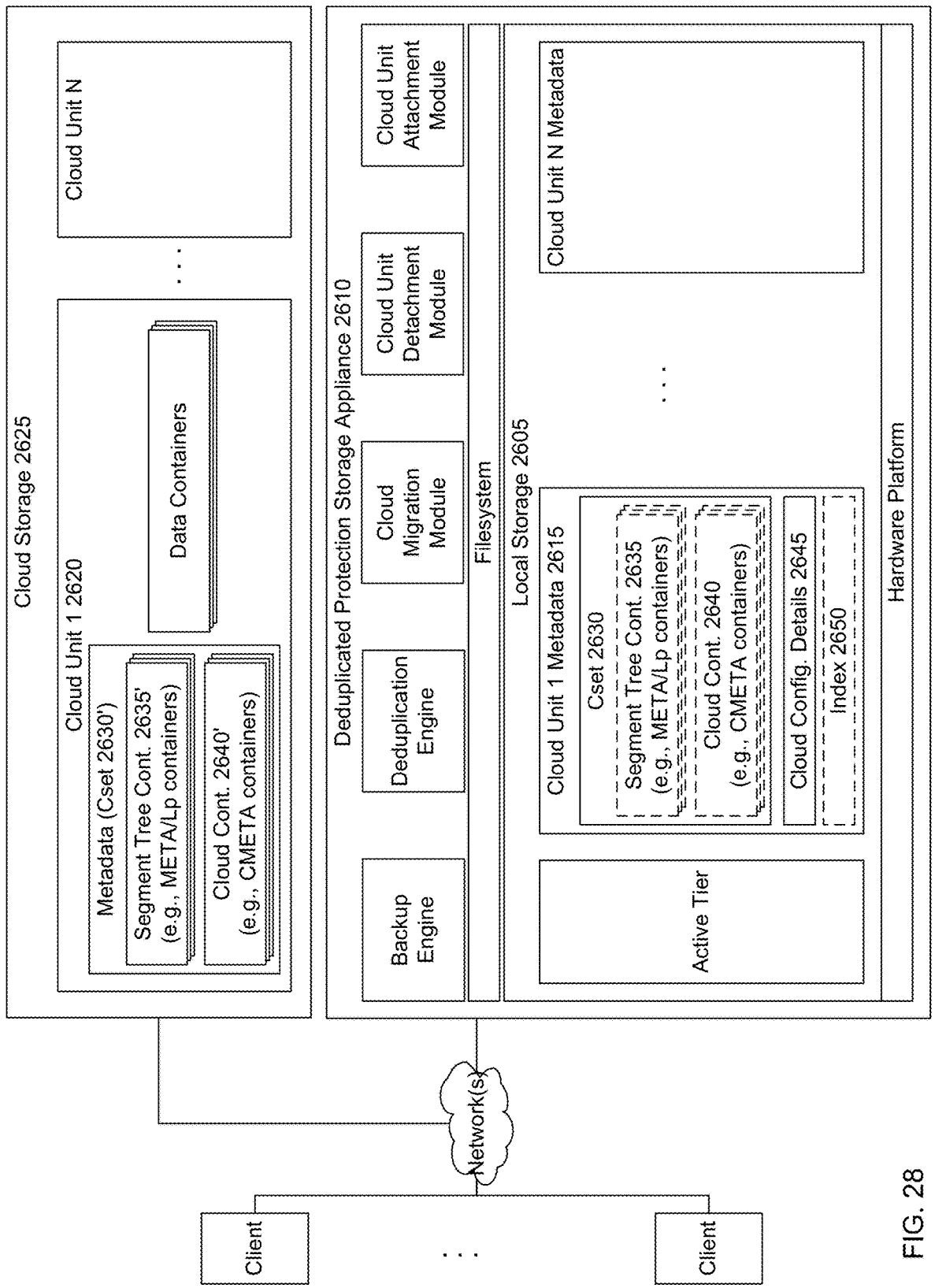
FIG. 28 shows an example of the system shown in FIG. 27 after a detachment operation places the cloud unit into an offline state, according to one or more embodiments.

FIG. 28 shows an example of the cloud unit in FIG. 27 after a detachment operation places the cloud unit into an off-line state from the read-only state. In the example of FIG. 28, a greater portion of cloud metadata at the local storage of the deduplicated storage appliance has been deleted thereby making additional space available for other cloud metadata. Specifically, segment tree containers 2635, cloud containers 2640, and index 2650 at the local storage are shown in broken lines to indicate that they have been deleted. Cloud configuration details 2645, however, are retained in local storage to allow the cloud unit to be later attached back.

Figure 29:
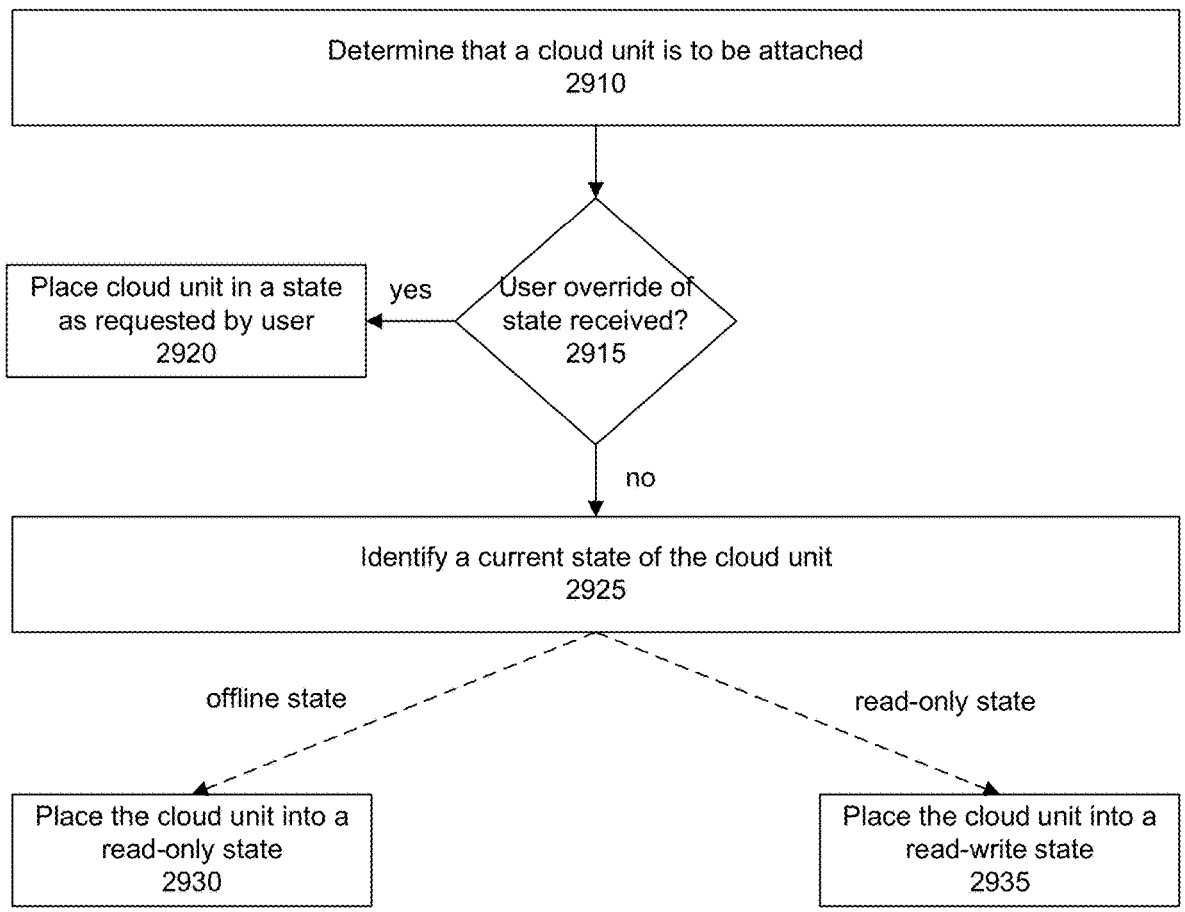
FIG. 29 shows another flow for attaching a cloud unit, according to one or more embodiments.

FIG. 29 shows a flow for attaching a cloud unit according to one or more embodiments. Attaching a cloud unit changes a state of the cloud unit. In a default configuration, attaching a cloud unit in an offline state places the cloud unit into a read-only state. Attaching a cloud unit in a read-only state places the cloud unit into a read-write state. Thus, in at least one embodiment, attaching a cloud unit follows a predefined stepped progression or series of states that is the reverse of detaching a cloud unit.

For example, in a step 2910, a determination is made that a cloud unit is to be attached. The determination may be based on detecting that cloud unit metadata space on local storage of the deduplicated storage appliance has become available. Alternatively, the determination may be based on having received a request from the user to attach a cloud unit (and cloud unit metadata space on local storage is available).

In a step 2915, a determination is made as to whether a user has specified a state. If so, in a step 2920, the cloud unit is placed in a state as requested by the user (assuming space is available to support the state). If space is not available to support the requested state, an error message is returned to the user.

Alternatively, if the user has not specified a state, in a step 2925, a current state of the cloud unit is identified. If the current state of the cloud unit is in an offline state, the cloud unit is placed into a read-only state (step 2930). As discussed, when a cloud unit is in an offline state, cloud unit metadata at local storage includes cloud configuration details associated with the cloud unit, but does not include the segment tree containers, cloud containers, or index.

In at least one embodiment, placing the cloud unit into the read-only state from the offline state includes recalling from cloud storage the cloud containers, but not the segment tree containers and rebuilding the index.

If the current state of the cloud unit is in a read-only state, the cloud unit is placed into a read-write state (step 2935). As discussed, when a cloud unit is in a read-only state, cloud unit metadata at local storage includes cloud configuration details associated with the cloud unit, cloud containers, and index, but does not include the segment tree containers.

In at least one embodiment, placing the cloud unit into the read-write state from the read-only state includes recalling from cloud storage the segment tree containers.

Figure 30:
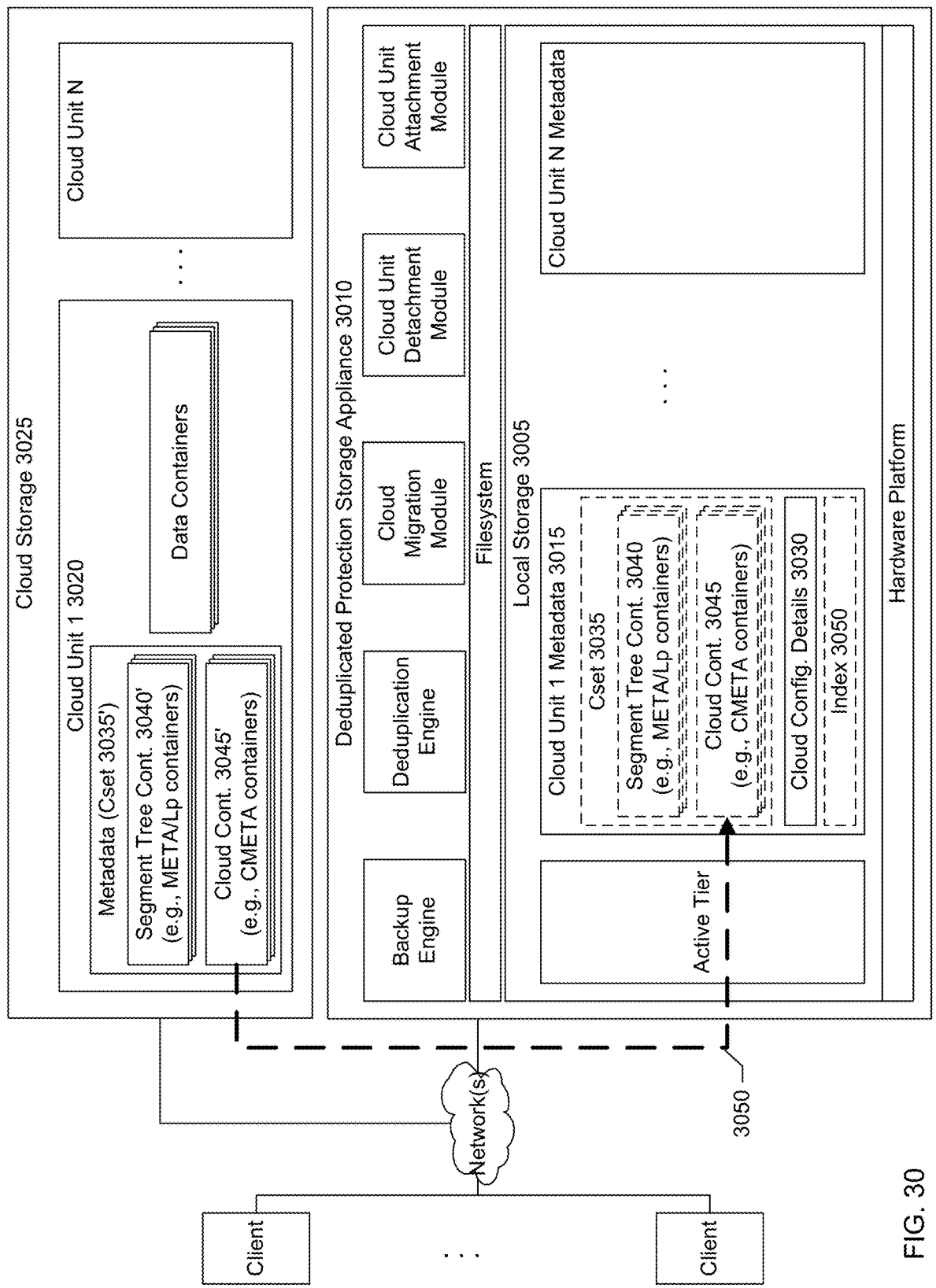
FIG. 30 shows an example of a system in which an attachment operation places a cloud unit into a read-only state from an offline state, according to one or more embodiments.

FIG. 30 shows an example of an attachment operation placing a cloud unit into a read-only state from an offline state. Specifically, local storage 3005 of a deduplicated storage appliance 3010 stores cloud metadata 3015 associated with a cloud unit 3020 in a cloud storage 3025. The cloud metadata at local storage includes cloud configuration details 3030, but not CSet 3035 (e.g., segment tree containers 3040 and cloud containers 3045) or an index 3050. These items are shown in broken lines to indicate that they are not present.

A copy of the CSet 3035' resides with the cloud unit in cloud storage including a copy of the segment tree containers 3040' and a copy of the cloud containers 3045'. Cloud containers 3040' (but not the segment tree containers) are recalled 3050 from cloud storage to local storage and the index is rebuilt to place the cloud unit into a read-only state.

Figure 31:
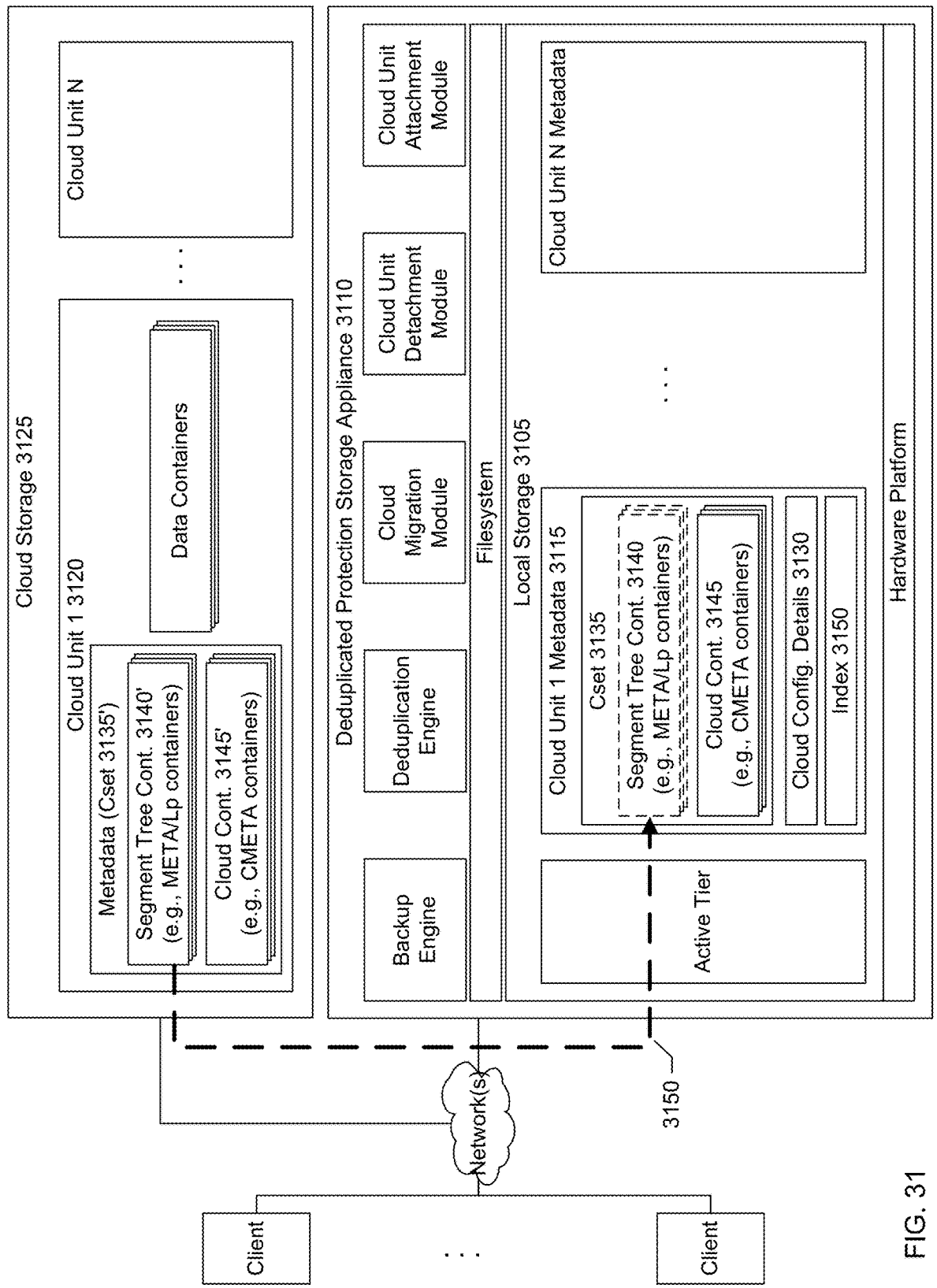
FIG. 31 shows an example of a system in which an attachment operation places a cloud unit into a read-write state from a read-only state, according to one or more embodiments.

FIG. 31 shows an example of an attachment operation placing a cloud unit into a read-write state from a read-only state. Specifically, local storage 3105 of a deduplicated storage appliance 3110 stores cloud metadata 3115 associated with a cloud unit 3120 in a cloud storage 3125. The cloud metadata at local storage includes cloud configuration details 3130, index 3150, and a portion of CSet 3135 that includes cloud containers 3145, but not segment tree containers 3140. Segment tree containers 3140 are shown in broken lines to indicate that they are not present.

A copy of the CSet 3135' resides with the cloud unit in cloud storage including a copy of the segment tree containers 3140' and a copy of the cloud containers 3145'. Segment tree containers 3140' are recalled 3150 from cloud storage to local storage to place the cloud unit into a read-write state.

Below are some benefits of the systems and techniques described herein.

1) Hundred percent read availability architecture provides total read availability of all the units in addition to read-write units with minimal metadata space overhead because of partial (CMETA only, META reads from cloud) metadata retention of read-only units.
2) "Infinite" cloud scaling architecture provides infinite offline units and a higher read only units in addition to read-write units compared to traditional design.
3) Higher read availability caters restore use cases of long-term retention data.
4) The Lp (META) read from the cloud helps mitigate metadata space requirement while expanding on cloud capacity.
5) Traditionally, recovery operations require downtime. In contrast, the systems and techniques described herein can perform all the operations online, thus avoiding system downtime.
6) Systems and techniques enhance multi-cloud experience with cost-effective flexibility to attach desired provider and storage class.
7) The described systems and techniques can be leveraged to provide storage as a service (SaaS) where offline units can be used for deep cold archival data and high readability architecture can be used for high restore ready availability.

In an embodiment, there is a method for cloud capacity scaling in metadata space constrained deduplication systems. In an embodiment, a method includes generating a plurality of containers comprising data containers storing segments of files, segment tree containers storing upper-level segments of segment trees representing the files, and cloud containers storing headers from the data and segment tree containers, wherein a header for a data container comprises fingerprints identifying the segments of files stored in the data container, and a header for a segment tree container comprises fingerprints identifying the upper-level segments stored in the segment tree container; sending to a cloud storage for storage as a cloud unit the plurality of containers; attaching the cloud unit to a deduplicated storage appliance by storing in local storage of the appliance the segment tree and cloud containers, cloud configuration details, and an index, the cloud configuration details identifying the cloud storage having the cloud unit, and the index mapping the fingerprints to the containers; determining that the cloud unit should be detached; and based on the determination, detaching the cloud unit from the appliance by deleting the segment tree and cloud containers, and index from the local storage, but maintaining the cloud configuration details.

The method may include: when the cloud unit is to be attached back to the appliance, consulting the cloud configuration details to access the cloud unit in the cloud storage; and prioritizing recovery to the local storage the cloud containers over the segment tree containers stored with the cloud unit in the cloud storage.

The method may include: while the cloud containers are being recovered, rebuilding the index from cloud containers that have been recovered. The method may include: upon receiving a request to access a segment tree container of the cloud unit that has not yet been recovered, redirecting the request to the cloud storage.

In an embodiment, the determining that the cloud unit should be detached comprises before attaching a new cloud unit to the appliance, detecting that the local storage does not have space to store segment tree containers, cloud containers, and index of the new cloud unit. In another embodiment, the determining that the cloud unit should be detached comprises receiving a request from a user to detach the cloud unit.

In an embodiment, there is a system comprising: a processor; and memory configured to store one or more sequences of instructions which, when executed by the processor, cause the processor to carry out the steps of: generating a plurality of containers comprising data containers storing segments of files, segment tree containers storing upper-level segments of segment trees representing the files, and cloud containers storing headers from the data and segment tree containers, wherein a header for a data container comprises fingerprints identifying the segments of files stored in the data container, and a header for a segment tree container comprises fingerprints identifying the upper-level segments stored in the segment tree container; sending to a cloud storage for storage as a cloud unit the plurality of containers; attaching the cloud unit to a deduplicated storage appliance by storing in local storage of the appliance the segment tree and cloud containers, cloud configuration details, and an index, the cloud configuration details identifying the cloud storage having the cloud unit, and the index mapping the fingerprints to the containers; determining that the cloud unit should be detached; and based on the determination, detaching the cloud unit from the appliance by deleting the segment tree and cloud containers, and index from the local storage, but maintaining the cloud configuration details.

In an embodiment, there is a computer program product, comprising a non-transitory computer-readable medium having a computer-readable program code embodied therein, the computer-readable program code adapted to be executed by one or more processors to implement a method comprising: generating a plurality of containers comprising data containers storing segments of files, segment tree containers storing upper-level segments of segment trees representing the files, and cloud containers storing headers from the data and segment tree containers, wherein a header for a data container comprises fingerprints identifying the segments of files stored in the data container, and a header for a segment tree container comprises fingerprints identifying the upper-level segments stored in the segment tree container; sending to a cloud storage for storage as a cloud unit the plurality of containers; attaching the cloud unit to a deduplicated storage appliance by storing in local storage of the appliance the segment tree and cloud containers, cloud configuration details, and an index, the cloud configuration details identifying the cloud storage having the cloud unit, and the index mapping the fingerprints to the containers; determining that the cloud unit should be detached; and based on the determination, detaching the cloud unit from the appliance by deleting the segment tree and cloud containers, and index from the local storage, but maintaining the cloud configuration details.

In an embodiment, there is a method for cloud capacity scaling with high readable capacity in metadata space constrained deduplication systems. In an embodiment, a method of scaling capacity in a deduplicated storage appliance having limited metadata space includes: maintaining a plurality of cloud units in a cloud storage, each cloud unit comprising a plurality of containers comprising data containers storing segments of files, segment tree containers storing upper-level segments of segment trees representing the files, and cloud containers storing headers from the data and segment tree containers, wherein a header for a data container comprises fingerprints identifying the segments of the files, and a header for a segment tree container comprises fingerprints identifying the upper-level segments; storing, at local storage of the deduplicated storage appliance, a first level of metadata for each cloud unit in a read-write state, a second level of metadata for each cloud unit in a read-only state, and a third level of metadata for each cloud unit in an offline state, the third level of metadata requiring less storage space than the first and second levels of metadata, and the second level of metadata requiring less storage space than the first level of metadata; and managing the limited metadata space on the deduplicated storage appliance by maintaining at least a subset of the plurality of cloud units in the read-only state.

In an embodiment, the second level of metadata does not comprise the segment tree containers, but comprises the cloud containers, cloud configuration details, and an index mapping the fingerprints to the containers. In an embodiment, the first level of metadata for a particular cloud unit in a read-write state comprises the segment tree containers, cloud containers, cloud configuration details, and an index mapping the fingerprints to the containers. In an embodiment, the third level of metadata for a particular cloud unit does not comprise the segment tree containers or cloud containers, but does comprise cloud configuration details.

In an embodiment, the managing the limited metadata space on the deduplicated storage appliance further comprises detaching a particular cloud unit, the detaching comprising: identifying a current state of the particular cloud unit; and when the current state of the particular cloud unit is the read-write state, placing the cloud unit into a read-only state.

In an embodiment, the managing the limited metadata space on the deduplicated storage appliance further comprises detaching a particular cloud unit, the detaching comprising: identifying a current state of the particular cloud unit; and when the current state of the particular cloud unit is the read-only state, placing the cloud unit into the offline state.

In another embodiment, there is a system for scaling capacity in a deduplicated storage appliance having limited metadata space, the system comprising: a processor; and memory configured to store one or more sequences of instructions which, when executed by the processor, cause the processor to carry out the steps of: maintaining a plurality of cloud units in a cloud storage, each cloud unit comprising a plurality of containers comprising data containers storing segments of files, segment tree containers storing upper-level segments of segment trees representing the files, and cloud containers storing headers from the data and segment tree containers, wherein a header for a data container comprises fingerprints identifying the segments of the files, and a header for a segment tree container comprises fingerprints identifying the upper-level segments; storing, at local storage of the deduplicated storage appliance, a first level of metadata for each cloud unit in a read-write state, a second level of metadata for each cloud unit in a read-only state, and a third level of metadata for each cloud unit in an offline state, the third level of metadata requiring less storage space than the first and second levels of metadata, and the second level of metadata requiring less storage space than the first level of metadata; and managing the limited metadata space on the deduplicated storage appliance by maintaining at least a subset of the plurality of cloud units in the read-only state.

In another embodiment, there is a computer program product, comprising a non-transitory computer-readable medium having a computer-readable program code embodied therein, the computer-readable program code adapted to be executed by one or more processors to implement a method of scaling capacity in a deduplicated storage appliance having limited metadata space comprising: maintaining a plurality of cloud units in a cloud storage, each cloud unit comprising a plurality of containers comprising data containers storing segments of files, segment tree containers storing upper-level segments of segment trees representing the files, and cloud containers storing headers from the data and segment tree containers, wherein a header for a data container comprises fingerprints identifying the segments of the files, and a header for a segment tree container comprises fingerprints identifying the upper-level segments; storing, at local storage of the deduplicated storage appliance, a first level of metadata for each cloud unit in a read-write state, a second level of metadata for each cloud unit in a read-only state, and a third level of metadata for each cloud unit in an offline state, the third level of metadata requiring less storage space than the first and second levels of metadata, and the second level of metadata requiring less storage space than the first level of metadata; and managing the limited metadata space on the deduplicated storage appliance by maintaining at least a subset of the plurality of cloud units in the read-only state.

In an embodiment, a method includes: providing a deduplicated storage system to which one or more cloud units are to be attached, the one or more cloud units being stored at cloud storage, remote from the deduplicated storage system; generating, for each cloud unit, a plurality of containers, an index, and cloud configuration details, the plurality of containers comprising data containers, segment tree containers, and cloud containers, wherein the data containers comprise data segments into which files of the deduplicated storage system have been split, and headers comprising fingerprints of the data segments, wherein the segment tree containers comprise upper-level segments of segment trees representing the files, and headers comprising fingerprints of the upper-level segments, wherein the cloud containers comprise the headers of the data containers and the headers of the segment tree containers, and wherein the index maps the fingerprints to the data containers and segment tree containers; sending, for each cloud unit, the data containers, segment tree containers, and cloud containers to the cloud storage; storing, for each cloud unit, the cloud configuration details, index, segment tree containers, and cloud containers at a local storage of the deduplicated storage system; when a new cloud unit is to be attached to the deduplicated storage system, but the local storage has reached capacity, detaching a cloud unit by deleting, from the local storage, the segment tree containers, cloud containers, and index, but maintaining cloud configuration details of the detached cloud unit on the local storage; when the detached cloud unit is to be reattached to the deduplicated storage system, accessing the cloud configuration details of the detached cloud unit to locate the detached cloud unit in the cloud storage and attaching the detached cloud unit comprising: prioritizing recovery of the cloud containers over the segment tree containers of the detached cloud unit; and while the cloud containers are being recovered, rebuilding the index of the detached cloud unit from cloud containers that have been recovered; and upon receiving a request to access a segment tree container of the detached cloud unit that has not yet been recovered, redirecting the request to the cloud storage.

In an embodiment, a method includes: sending, to a cloud storage for storage as a cloud unit, data of files managed by a deduplicated storage system and metadata associated with the files; storing, at local storage of the deduplicated storage system, cloud configuration details for the cloud unit and the metadata to allow input/output (IO) operations to the cloud unit; when a new cloud unit is to be attached to the deduplicated storage system, but the local storage of the deduplicated storage system for metadata of the new cloud unit has reached capacity, deleting the metadata of the cloud unit from the local storage thereby rending the cloud unit unavailable for the IO operations, but making space available for the metadata of the new cloud unit; and when the cloud unit is to be attached back to the deduplicated storage system, consulting the cloud configuration details to access the cloud unit in the cloud storage and recover the metadata stored in the cloud unit.

Referring back now to FIG. 1, the clients may include servers, desktop computers, laptops, tablets, smartphones, internet of things (IoT) devices, or combinations of these. The data protection storage system receives requests from the clients, performs processing required to satisfy the requests, and forwards the results corresponding to the requests back to the requesting client system. The processing required to satisfy the request may be performed by the data protection storage appliance or may alternatively be delegated to other servers connected to the network.

The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The storage system may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays, shared storage pool, or an object or cloud storage service. In an embodiment, storage (e.g., tape or disk array) may represent any practical storage device or set of devices, such as tape libraries, virtual tape libraries (VTL), fiber-channel (FC) storage area network devices, and OST (OpenStorage) devices. The storage may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. Thus, storage may represent logical storage that includes any number of physical storage devices connected to form a logical storage.

Figure 32:
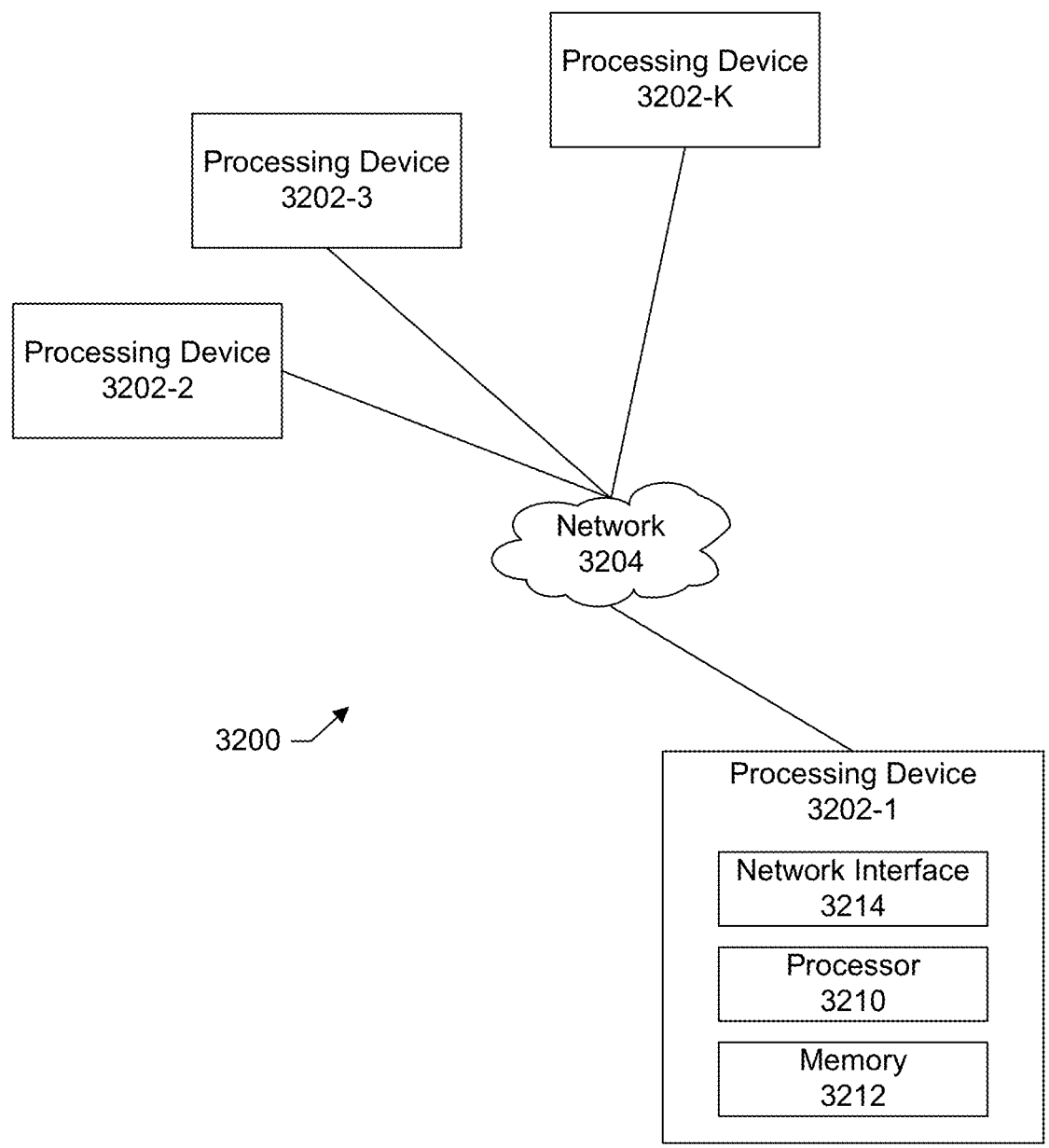
FIG. 32 shows a block diagram of a processing platform that may be utilized to implement at least a portion of an information processing system, according to one or more embodiments.

FIG. 32 shows an example of a processing platform 3200 that may include at least a portion of the information handling system shown in FIG. 1. The example shown in FIG. 32 includes a plurality of processing devices, denoted 3202-1, 3202-2, 3202-3 . . . 3202-K, which communicate with one another over a network 3204.

The network 3204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 3202-1 in the processing platform 3200 comprises a processor 3210 coupled to a memory 3212.

The processor 3210 may comprise a microprocessor, a microcontroller, an application-specific integrated circuit (ASIC), a field-programmable gate array (FPGA) or other type of processing circuitry, as well as portions or combinations of such circuitry elements.

The memory 3212 may comprise random access memory (RAM), read-only memory (ROM) or other types of memory, in any combination. The memory 3212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 3202-1 is network interface circuitry 3214, which is used to interface the processing device with the network 3204 and other system components, and may comprise conventional transceivers.

The other processing devices 3202 of the processing platform 3200 are assumed to be configured in a manner similar to that shown for processing device 3202-1 in the figure.

Again, the particular processing platform 3200 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 33:
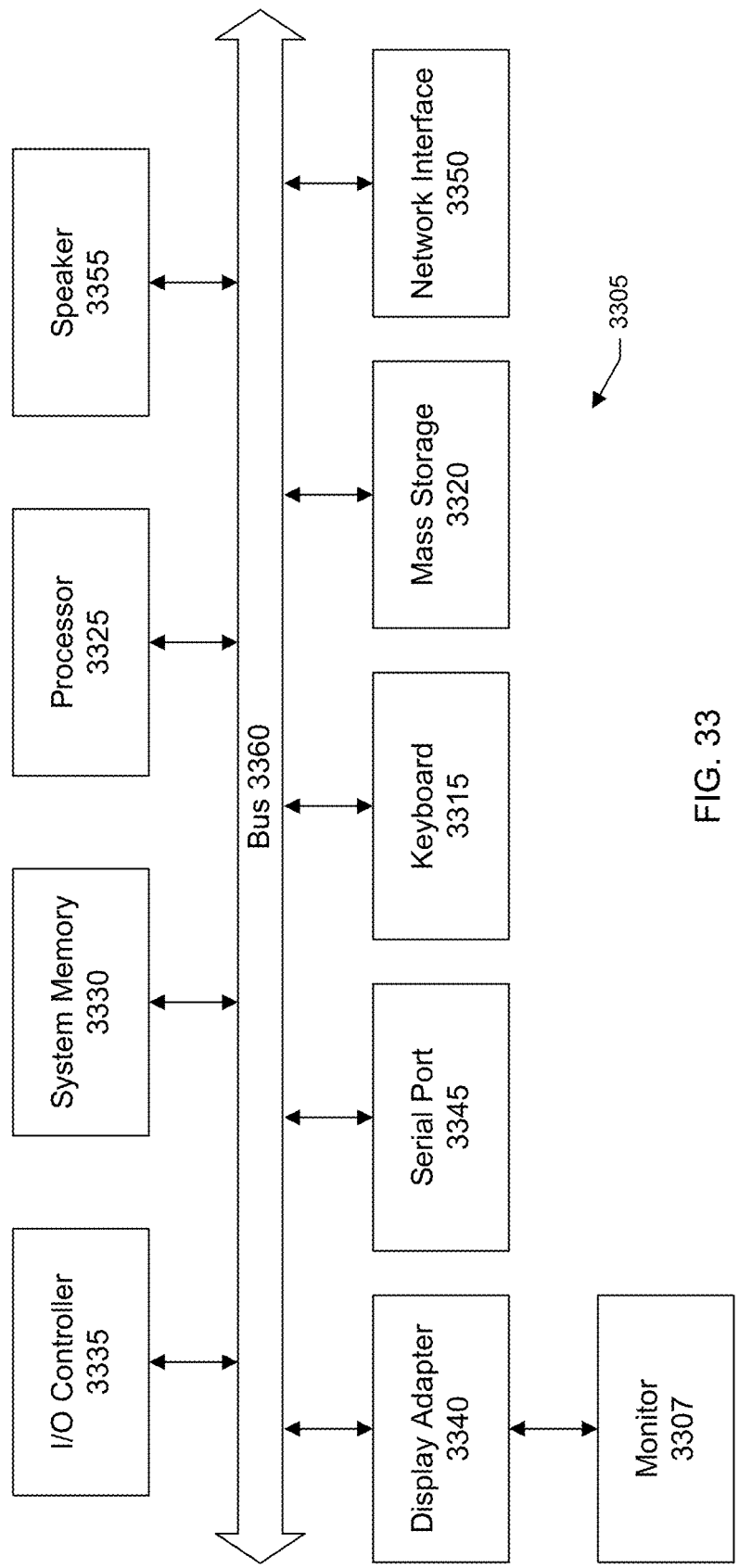
FIG. 33 shows a block diagram of a computer system suitable for use with the system, according to one or more embodiments.

FIG. 33 shows a system block diagram of a computer system 3305 used to execute the software of the present system described herein. The computer system includes a monitor 3307, keyboard 3315, and mass storage devices 3320. Computer system 3305 further includes subsystems such as central processor 3325, system memory 3330, input/output (I/O) controller 3335, display adapter 3340, serial or universal serial bus (USB) port 3345, network interface 3350, and speaker 3355. The system may also be used with computer systems with additional or fewer subsystems. For example, a computer system could include more than one processor 3325 (i.e., a multiprocessor system) or a system may include a cache memory.

Arrows such as 3360 represent the system bus architecture of computer system 3305. However, these arrows are illustrative of any interconnection scheme serving to link the subsystems. For example, speaker 3355 could be connected to the other subsystems through a port or have an internal direct connection to central processor 3325. The processor may include multiple processors or a multicore processor, which may permit parallel processing of information. Computer system 3305 shown in FIG. 33 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows® family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
    generating, by a processor, a plurality of containers comprising data containers storing segments of files, segment tree containers storing upper-level segments of segment trees representing the files, and cloud containers storing headers from the data and segment tree containers, wherein a header for a data container comprises fingerprints identifying the segments of files stored in the data container, and a header for a segment tree container comprises fingerprints identifying the upper-level segments stored in the segment tree container;
    sending to a cloud storage for storage as a cloud unit the plurality of containers;

attaching the cloud unit to a deduplicated storage appliance by storing in local storage of the appliance the segment tree and cloud containers, cloud configuration details, and an index, the cloud configuration details identifying the cloud storage having the cloud unit, and the index mapping the fingerprints to the containers;

determining that the cloud unit should be detached; and based on the determination, detaching the cloud unit from the appliance by deleting the segment tree and cloud containers, and index from the local storage, but maintaining the cloud configuration details.

2. The method of claim 1 further comprising:

consulting the cloud configuration details to access the cloud unit in the cloud storage and attach the cloud unit back to the appliance; and prioritizing recovery to the local storage the cloud containers over the segment tree containers stored with the cloud unit in the cloud storage.

3. The method of claim 2 further comprising:

rebuilding the index from cloud containers that have been recovered.

4. The method of claim 2 further comprising:

upon receiving a request to access a segment tree container of the cloud unit that has not yet been recovered, redirecting the request to the cloud storage.

5. The method of claim 1 wherein the determining that the cloud unit should be detached comprises before attaching a new cloud unit to the appliance, detecting that the local storage does not have space to store segment tree containers, cloud containers, and index of the new cloud unit.

6. The method of claim 1 wherein the determining that the cloud unit should be detached comprises receiving a request from a user to detach the cloud unit.

7. A system comprising: a processor; and memory configured to store one or more sequences of instructions which, when executed by the processor, cause the processor to carry out the steps of:

generating a plurality of containers comprising data containers storing segments of files, segment tree containers storing upper-level segments of segment trees representing the files, and cloud containers storing headers from the data and segment tree containers, wherein a header for a data container comprises fingerprints identifying the segments of files stored in the data container, and a header for a segment tree container comprises fingerprints identifying the upper-level segments stored in the segment tree container;

sending to a cloud storage for storage as a cloud unit the plurality of containers;

attaching the cloud unit to a deduplicated storage appliance by storing in local storage of the appliance the segment tree and cloud containers, cloud configuration details, and an index, the cloud configuration details identifying the cloud storage having the cloud unit, and the index mapping the fingerprints to the containers;

determining that the cloud unit should be detached; and based on the determination, detaching the cloud unit from the appliance by deleting the segment tree and cloud containers, and index from the local storage, but maintaining the cloud configuration details.

8. The system of claim 7 wherein the processor further carries out the steps of:

consulting the cloud configuration details to access the cloud unit in the cloud storage and attach the cloud unit back to the appliance; and prioritizing recovery to the local storage the cloud containers over the segment tree containers stored with the cloud unit in the cloud storage.

9. The system of claim 8 wherein the processor further carries out the step of:

rebuilding the index from cloud containers that have been recovered.

10. The system of claim 8 wherein the processor further carries out the step of:

upon receiving a request to access a segment tree container of the cloud unit that has not yet been recovered, redirecting the request to the cloud storage.

11. The system of claim 7 wherein the determining that the cloud unit should be detached comprises before attaching a new cloud unit to the appliance, detecting that the local storage does not have space to store segment tree containers, cloud containers, and index of the new cloud unit.

12. The system of claim 7 wherein the determining that the cloud unit should be detached comprises receiving a request from a user to detach the cloud unit.

13. A computer program product, comprising a non-transitory computer-readable medium having a computer-readable program code embodied therein, the computer-readable program code adapted to be executed by one or more processors to implement a method comprising:

generating a plurality of containers comprising data containers storing segments of files, segment tree containers storing upper-level segments of segment trees representing the files, and cloud containers storing headers from the data and segment tree containers, wherein a header for a data container comprises fingerprints identifying the segments of files stored in the data container, and a header for a segment tree container comprises fingerprints identifying the upper-level segments stored in the segment tree container;

sending to a cloud storage for storage as a cloud unit the plurality of containers;

attaching the cloud unit to a deduplicated storage appliance by storing in local storage of the appliance the segment tree and cloud containers, cloud configuration details, and an index, the cloud configuration details identifying the cloud storage having the cloud unit, and the index mapping the fingerprints to the containers;

determining that the cloud unit should be detached; and based on the determination, detaching the cloud unit from the appliance by deleting the segment tree and cloud containers, and index from the local storage, but maintaining the cloud configuration details.

14. The computer program product of claim 13 wherein the method further comprises:

consulting the cloud configuration details to access the cloud unit in the cloud storage and attach the cloud unit back to the appliance; and prioritizing recovery to the local storage the cloud containers over the segment tree containers stored with the cloud unit in the cloud storage.

15. The computer program product of claim 14 wherein the method further comprises:

rebuilding the index from cloud containers that have been recovered.

16. The computer program product of claim 14 wherein the method further comprises:

upon receiving a request to access a segment tree container of the cloud unit that has not yet been recovered, redirecting the request to the cloud storage.

17. The computer program product of claim 13 wherein the determining that the cloud unit should be detached comprises before attaching a new cloud unit to the appliance, detecting that the local storage does not have space to store segment tree containers, cloud containers, and index of the new cloud unit.

18. The computer program product of claim 13 wherein the determining that the cloud unit should be detached comprises receiving a request from a user to detach the cloud unit.

\* \* \* \* \*